United States Patent
Okada et al.

(10) Patent No.: US 7,698,503 B2
(45) Date of Patent: Apr. 13, 2010

(54) COMPUTER SYSTEM WITH DATA RECOVERING, METHOD OF MANAGING DATA WITH DATA RECOVERING AND MANAGING COMPUTER FOR DATA RECOVERING

(75) Inventors: Wataru Okada, Yokohama (JP); Masahide Sato, Noda (JP); Jun Mizuno, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 690 days.

(21) Appl. No.: 11/554,218

(22) Filed: Oct. 30, 2006

(65) Prior Publication Data

US 2008/0059732 A1 Mar. 6, 2008

(30) Foreign Application Priority Data

Sep. 6, 2006 (JP) .............................. 2006-241482

(51) Int. Cl.
G06F 12/00 (2006.01)
G06F 12/08 (2006.01)

(52) U.S. Cl. ........................ 711/115; 711/156; 711/161; 711/162; 711/165; 711/170; 708/530; 708/531; 714/2; 714/6; 714/758; 714/800; 714/801; 714/803; 714/805

(58) Field of Classification Search ........................ None
See application file for complete search history.

(56) References Cited

U.S. PATENT DOCUMENTS

| 2004/0193945 | A1 | 9/2004 | Eguchi et al. |
| 2004/0257857 | A1 | 12/2004 | Yamamoto et al. |
| 2005/0015416 | A1* | 1/2005 | Yamagami ................. 707/204 |
| 2005/0111249 | A1 | 5/2005 | Yagisawa et al. |
| 2007/0233950 | A1* | 10/2007 | Innan et al. ................. 711/114 |

FOREIGN PATENT DOCUMENTS

| JP | 2004-252686 | 9/2004 |
| JP | 2005-011277 | 1/2005 |
| JP | 2005-157710 | 6/2005 |

* cited by examiner

*Primary Examiner*—Tuan V Thai
*Assistant Examiner*—Midys Rojas
(74) *Attorney, Agent, or Firm*—Brundidge & Stanger, P.C.

(57) ABSTRACT

A computer system including: at least one host computer, a storage system for storing data used in the host computer, and a managing computer for managing storing the data in the storage system which are connected to each other with a network. The managing computer monitors the journal volume which is a storing destinations of the journal, in a case that the journal is stored in the journal volume in parallel, when it is detected that the storing destination of the journal changes from one of the groups into which the journal is just stored to another group, transmits an instruction to the storage system to change the storing destination of the journal to another group.

20 Claims, 18 Drawing Sheets

FIG.2

10291 PARITY GROUP FORMATION TABLE

| Disk_ID (3001) | CAPACITY (3002) | PG_ID (3003) |
|---|---|---|
| Disk_1 | 100G | PG_1 |
| Disk_2 | 100G | PG_1 |
| Disk_3 | 100G | PG_1 |
| ... | ... | ... |

FIG.3

10292 LOGICAL VOLUME TABLE

| LU_ID (4001) | STORAGE SIZE (4002) | PG_ID (4003) |
|---|---|---|
| LU_01 | 20G | PG_1 |
| LU_02 | 20G | PG_1 |
| LU_03 | 20G | PG_1 |
| ... | ... | ... |

FIG.4

10293 JOURNAL GROUP TABLE

| JNLG_ID | ORDINAL COUNTER | LATEST JNL STORING VOL_ID | LATEST JNL STORING ADDRESS | OLDEST JNL STORING VOL_ID | OLDEST JNL STORING ADDRESS | SNAPSHOT ACQUISITION TIMING |
|---|---|---|---|---|---|---|
| JNLG_1 | 110 | LU_30 | 10000 | LU_31 | 11000 | 3000 |
| JNLG_2 | 103 | LU_34 | 20000 | LU_37 | 21000 | 2000 |
| JNLG_3 | 104 | LU_38 | 30000 | LU_39 | 31000 | 3000 |
| ... | ... | ... | ... | ... | ... | ... |

10294 DATA VOLUME TABLE

| JNLG_ID (6001) | DATA VOLUME ID (6002) |
|---|---|
| JNLG_1 | LU_11 |
| JNLG_1 | LU_12 |
| JNLG_1 | LU_13 |
| JNLG_2 | LU_14 |
| ... | ... |

FIG.6

10295 SNAPSHOT VOLUME MANAGING TABLE

| SSVOL GROUP ID (7001) | SNAPSHOT VOLUME ID (7002) | CORRESPONDING DATA VOLUME ID (7003) |
|---|---|---|
| SSG_1 | LU_21 | LU_11 |
| SSG_1 | LU_22 | LU_12 |
| SSG_1 | LU_23 | LU_13 |
| SSG_2 | LU_24 | LU_11 |
| ... | ... | ... |

FIG.7

10296 SSVOL GROUP MANAGING TABLE

| JNLG_ID | SSVOL GROUP ID | USING ORDER | NEXT USING FLAG | ORDINAL NUMBER | ACQUISITION TIME |
|---------|----------------|-------------|-----------------|----------------|------------------|
| JNLG_1  | SSG_1          | 1           | TRUE            | 100            | 2005/06/01 10:00 |
| JNLG_1  | SSG_2          | 2           | FALSE           | 105            | 2005/06/01 11:00 |
| JNLG_1  | SSG_3          | 3           | FALSE           | 110            | 2005/06/01 12:00 |
| JNLG_2  | SSG_4          | 1           | FALSE           | 100            | 2005/06/01 10:00 |
| ...     | ...            | ...         | ...             | ...            | ...              |

FIG.8

10297 JOURNAL VOLUME TABLE

| JNLG_ID | JNL VOLUME ID | USING ORDER | START TIME | END TIME | USED STORAGE SIZE |
|---|---|---|---|---|---|
| JNLG_1 | LU_31 | 1 | 2005/06/01 12:00 | 2005/06/01 14:00 | 2G |
| JNLG_1 | LU_32 | 2 | 2005/06/01 14:00 | 2005/06/01 16:00 | 3G |
| JNLG_2 | LU_34 | 1 | 2005/06/01 12:00 | 2005/06/01 14:00 | 2G |
| ... | ... | ... | ... | ... | ... |

JOURNAL FORMATION

| DATA VOLUME ID | ~10001 |
| APPLYING DESTINATION ADDRESS | ~10002 |
| DATA LENGTH | ~10003 |
| GENERATION TIME | ~10004 |
| ORDINAL NUMBER | ~10005 |
| AFTER JOURNAL | ~10006 |
| BEFORE JOURNAL | ~10007 |
| NEXT JOURNAL VOLUME ID | ~10008 |
| NEXT JOURNAL ADDRESS | ~10009 |
| PRIOR JOURNAL VOLUME ID | ~10010 |
| PRIOR JOURNAL ADDRESS | ~10011 |

FIG.10

12531 JNL STORING DESTINATION LINKING MANAGING TABLE

| MANAGING ID (11001) | JNLG_ID (11002) | JNLVOL TOTAL SIZE (11003) | NEXT PARTITION POWER ON TIMING (THRESHOLD) (11004) |
|---|---|---|---|
| Group_1 | JNLG_1 | 30G | 100M |
| Group_1 | JNLG_2 | 30G | 100M |
| ... | ... | ... | ... |

FIG.11

12532 PARTITION MANAGING TABLE

| MANAGING ID (12001) | PARTITION ID (12002) | PRESENCE-OR-ABSENCE OF ASSIGNMENT (12003) |
|---|---|---|
| Group_1 | PG_01 | TRUE |
| Group_1 | PG_02 | FALSE |
| ... | ... | ... |

FIG.12

12533 MANAGING GROUP TABLE

| MANAGING ID (13001) | MONITORING PERIOD (13002) | CURRENTLY-IN-USE PARTITION (13003) |
|---|---|---|
| Group_1 | 10sec | PG_1 |
| Group_2 | 10sec | PG_2 |
| ... | ... | ... |

VIRTUAL VOLUME MANAGING TABLE

| VOL_ID | CAPACITY | EXTERNAL UNIT ID | PATH |
|--------|----------|------------------|------|
| LU_91 | 20G | DF700_1 | P1_T1_L1 |
| LU_92 | 20G | DF700_1 | P2_T1_L1 |
| LU_93 | 20G | DF700_1 | P3_T1_L1 |
| ... | ... | ... | ... |

Columns: 19001, 19002, 19003, 19004

FIG.20

12533a MANAGING GROUP TABLE

| MANAGING ID /13001 | MONITORING PERIOD /13002 | CURRENTLY-IN-USE PARTITION /13003 | CURRENTLY-IN-USE PARTITION (SNAPSHOT) /13004 |
|---|---|---|---|
| Group_1 | 10sec | PG_1 | PG_3 |
| Group_2 | 10sec | PG_2 | PG_4 |
| ... | ... | ... | ... |

FIG.21

SNAPSHOT STORING DESTINATION LINKING MANAGING TABLE

| JNLG_ID /22001 | GENERATION NUMBER /22002 |
|---|---|
| JNLG_1 | 4 |
| JNLG_2 | 4 |
| ... | ... |

US 7,698,503 B2

COMPUTER SYSTEM WITH DATA RECOVERING, METHOD OF MANAGING DATA WITH DATA RECOVERING AND MANAGING COMPUTER FOR DATA RECOVERING

CROSS REFERENCE TO RELATED APPLICATIONS

The present application is based on Japanese application JP 2006-241482, filed on Sep. 6, 2006, the content of which is hereby incorporated by reference into this application.

BACKGROUND OF THE INVENTION

1. Field of the Invention

The present invention relates to a computer system with data recovering, a method of managing data with data recovering and a managing computer for data recovering.

2. Description of the Related Art

Generally, in an information system, a backup operation is periodically made to recover data lost upon a trouble in a storage system, data corruption, an erroneous operation by a user.

For this, a backup and recovery technology using journaling (acquisition of updating history) is proposed. For example, U.S. patent application publication No. 20050015416, which is incorporated herein by reference, discloses backup and recovery technology using the journaling as follows:

A snapshot (full-backup or logical image such as differential backup) at a specific timing of a logical group (hereinafter referred to as journal group) including more than one data volume (data storing area) is acquired. Data written after that in the data volume is stored in a journal volume related to the journal group as journal (referred to as AFTER journal). Data at specific timing is recovered by applying of a series of the AFTER journals to the acquired snapshot in order of writing the AFTER journals. Generally, this is an example of a technology referred to as CDP (Continuous Data Protection).

Further, U.S. patent application publication No. 20050015416 discloses a method of canceling application of the AFTER journal to the snapshot when the recovered data is corrupted after application of the AFTER journal. U.S. patent application publication No. 20050015416 also discloses as follows:

Data at an area on which new data is overwritten upon applying the AFTER journal to the snapshot is saved in the journal volume. When application of the AFTER journal is cancelled, the data is recovered to the snapshot before the AFTER journal is applied in short time by applying the saved data (writing the saved data) to the original area to the snapshot to which the AFTER journal is applied. The saved data is referred to as BEFORE journal.

Japanese Laid-open Patent Application Publication No. 2004-252686 discloses a technology in which the AFTER journal and the BEFORE journal are acquired at the same time when the data from a host computer is written. This recovers past data by applying the BEFORE journal to the volume in use. The AFTER journal, the BEFORE journal, and meta data for managing the journals are simply referred to as journal. Further, the snapshot, which is a target to which the journal is applied when recovering, is referred to as base snapshot.

Further, a technology is disclosed in which lives of disk drives forming a storage system are expanded and a power consumption of a disk array of the system is reduced (for example, Japanese Laid-open Patent Application Publication No. 2005-157710). Japanese Laid-open Patent Application Publication No. 2005-157710 discloses a technology in which a managing computer controls a power for disk drives as follows:

The managing computer includes a disk control program for sending an instruction to the disk array to turn ON/OFF a power for the disk drives forming a specific logical volume. The storage system includes a power control instruction receiving program for receiving the ON/OFF instruction for the power source and a disk power control circuit for turning ON/OFF disk drives corresponding to the logical volume.

SUMMARY OF THE INVENTION

A first aspect of the present invention provides a computer system comprising: at least one host computer, a storage system for storing data used in the host computer, and a managing computer for managing storing the data in the storage system which are connected to each other through a network, wherein the storage system includes disk drives and a processing part for receiving the data which the host computer writes in the data volume, the disk drive unit includes at least a data volume for storing the data, a snapshot volume for storing a snapshot which is an data image of the data volume at certain timing, and a journal volume, correspondingly assigned to the data volume, for storing the received data as a journal, the journal volume being logically or physically classified into any of a plurality of groups, wherein the processing part recovers the data by applying the journal to the snapshot, wherein the managing computer monitors the journal volume which is a storing destination of the journal, and in a case that a plurality of the journals are stored in a plurality of the journal volumes in parallel, when it is detected that the storing destination of one of the journals changes from one of the groups into which the one of the journals is just stored to another one of the groups, transmits an instruction to the storage system to change the storing destination of the other of the journals to the another one of the groups, and wherein the processing part of the storage system changes the storing designation of the journals to the another one of the groups in response to the instruction from the managing computer.

A second aspect of the present invention provides a data managing method in a computer system including: at least one host computer, a storage system for storing data used by the host computer, and a managing computer for managing storing the data in the storage system which are connected to each other with a network, wherein the storage system includes disk drives and a processing part for receiving the data which the host computer writes in the data volume, the disk drive unit includes at least a data volume for storing the data, a snapshot volume for storing a snapshot which is an data image of the data volume at certain timing, and a journal volume, correspondingly assigned to the data volume, for storing the received data as a journal, the journal volume being logically or physically classified into any of a plurality of groups, wherein the processing part recovers the data by applying the journal to the snapshot, comprising the steps of: in the managing computer, monitoring the journal volume which is a storing destination of the journal, and in a case that a plurality of the journals are stored in a plurality of the journal volumes in parallel, when it is detected that the storing destination of one of the journals changes from one of the groups into which the one of the journals is just stored to another one of the groups, transmitting an instruction to the storage system to change the storing destination of the other of the journals to the another one of the groups; and in the processing part of the storage system, changing the storing designation of the journals to the another one of the groups in response to the instruction from the managing computer.

A third aspect of the present invention provides a managing computer, connected through a network to at least a host computer and a storage system, including at least one data volume for storing data used by the host computer, for storing a snapshot which is a data image of the data volume at certain timing in a snapshot volume, receiving the data written in the data volume by the host computer and storing the data as a journal in a journal volume which is logically or physically classified into a plurality of groups, and recovering the data by applying the journal to the snapshot, for managing storing data in the storage system, comprising: a processing part for monitoring the journal volume which is a storing destination of the journal, and in a case that a plurality of the journals are stored in the journal volumes in parallel, when it is detected that the storing destination of one of the journals changes from one of the groups into which the one of the journals is just stored to another one of the groups, transmitting an instruction to the storage system to change the storing destinations of the journals to another one of the groups.

BRIEF DESCRIPTION OF THE DRAWINGS

The object and features of the present invention will become more readily apparent from the following detailed description taken in conjunction with the accompanying drawings in which:

FIG. 2 shows an example of a parity group formation table according to the first embodiment;

FIG. 3 shows an example of a logical volume table according to the first embodiment;

FIG. 4 shows an example of a journal group table according to the first embodiment;

FIG. 5 shows an example of a data volume table according to the first embodiment;

FIG. 6 shows an example of a snapshot volume managing table according to the first embodiment;

FIG. 7 shows an example of an SSVOL group managing table according to the first embodiment;

FIG. 8 shows an example of a journal volume table according to the first embodiment;

FIG. 9 shows an example of a journal formation according to the first embodiment;

FIG. 10 shows an example of a JNL storing destination linking managing table according to the first embodiment;

FIG. 11 shows an example of a partition managing table according to the first embodiment;

FIG. 12 shows an example of a managing group table according to the first embodiment;

FIG. 20 shows an example of a managing group table according to the third embodiment;

FIG. 21 shows an example of a snapshot storing destination linking managing table according to the third embodiment;

The same or corresponding elements or parts are designated with like references throughout the drawings.

DETAILED DESCRIPTION OF THE INVENTION

Prior to describing an embodiment of the present invention, the above-mentioned related art will be further argued.

According to U.S. patent application publication No. 20050015416 and Japanese Laid-open Patent Application Publication No. 2004-252686, a destination of storing a newly generated journal is determined irrespective of the generation timing of the journal. For example, in U.S. patent application publication No. 20050015416, an address next to an end of the journal which is generated and stored just before is determined as a top address of storing the newly generated journal. The top address for storing is determined irrespective of when the new journal is generated. In addition, Japanese Laid-open Patent Application Publication No. 2004-252686 does not disclose a method of determining the destination of storing the journal.

As mentioned above, if the destination of storing the journal is determined irrespective of timing of generating the journal in a computer system including a plurality of journals, destinations of storing the journals generated for each journal group cannot be localized (unified) for each time zone. Accordingly, a function for managing attribution (power supplying status or the like) for each assembly of specific logical volumes or each assembly of specific physical volumes cannot be applied to managing journals generated within a specific time zone.

Figure 25:
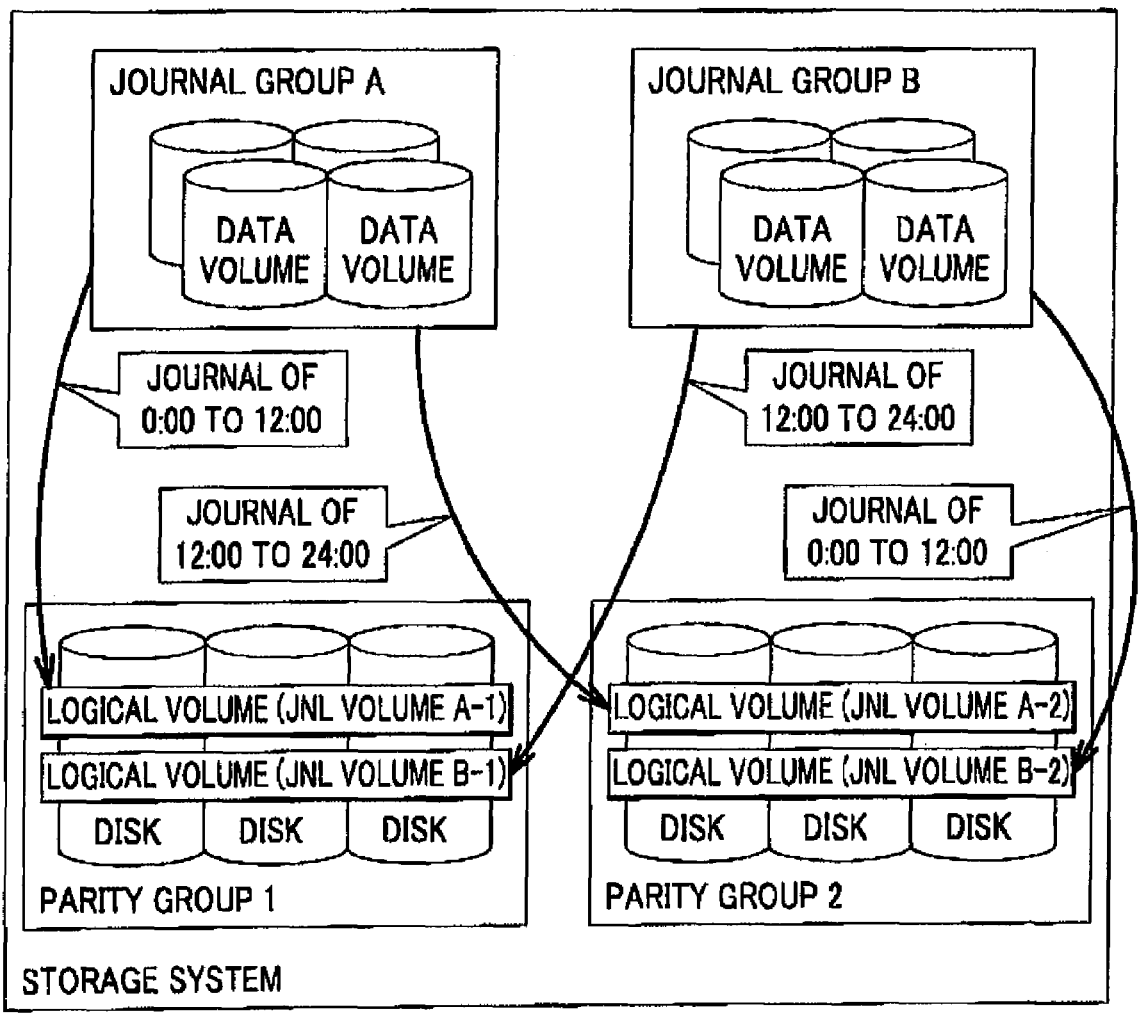
FIG. 25 is a block diagram of a proto-type computer system according to the present invention.

The inventors prepare a proto-type system to analyze this as shown in FIG. 25. This storage system has a journal group A and a journal group B, each including a plurality of data volumes. Further, the storage system has a parity group 1 and a parity group 2, each including a plurality of disk drives and being a unit for adding parities. From each parity group, a plurality of logical volumes are made. Of the logical volumes, a JNL (journal) volume A-1 and a JNL volume A-2 are configured to store the journals generated in the journal group A. Of the logical volumes, a JNL (journal) volume B-1 and a JNL volume B-2 are made to include such a relation as to store the journals generated in the journal group B.

In this configuration, if the destination of storing the journal generated in response to data written by the computer is determined irrespective of generation timing, for example, a following case may occur:

As to the journal group A, the journal is stored in the JNL volume A-1 at a time zone from 0:00 to 12:00 on a certain day. As to the journal group B, the journal is stored in the JNL volume B-2 at that time zone. At a time zone from 12:00 to 24:00, as to the journal group A, the journal is stored in the JN1 volume A-2. As to the journal group B, the journal is stored in the JNL volume B-1. As a result, the journals of different time zones are stored in a single parity group. Thus, a function for managing the attribution of the parity group cannot be applied to management of the journals generated at a specific time zone. More specifically, because each parity group always has a possibility of storing a new journal, the technology, disclosed in Japanese Laid-open Patent Application Publication No. 2005-157710, for turn OFF the disk drives forming the parity group cannot be applied to this system.

The inventors provide a computer system with data recovering, a method of managing data with data recovering and a managing computer for data recovering so as to apply a function of managing an attribution for each assembly of specific logical volumes or each assembly of specific physical volumes to management of the journals generated at a specific time zone so that the destination of storing the journals at a specific timing over a plurality of journal groups can be localized.

With reference drawings will be described a computer system with data recovery, a method of managing data with data recovery and a managing computer for with data recovery according to first to third embodiments of the present invention. The computer system with data recovery, the method of managing data with data recovery, and the managing computer for data recovery are used, for example, in management of data regarding ATMs (Automatic Teller Machine) in monetary facilities or management of transmission and reception data of mails of members in an organization.

The present invention is not limited to the embodiments described hereinafter.

In addition, an assembly of the logical volumes or physical volumes is referred to as a partition.

Further, description, "a partition stores a journal" means that any volume belonging to the partition stores the journal.

First Embodiment (1) System Configuration

Figure 1:
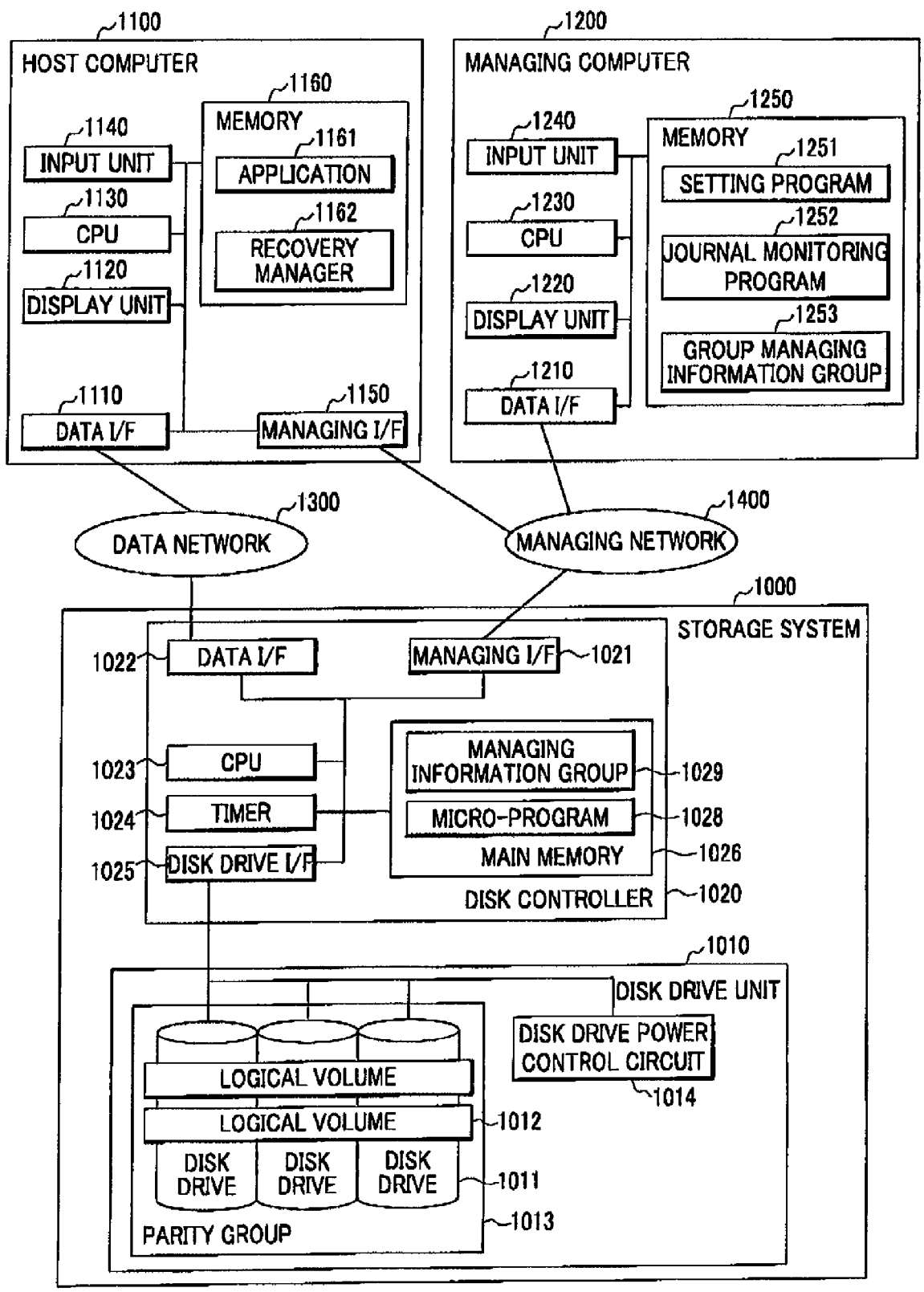
FIG. 1 is a block diagram of the computer system according to a first embodiment of the present invention.

FIG. 1 is a block diagram of a computer system with data recovery according to a first embodiment of the present invention. In the system, a storage unit 1000 and a host computer 1100 are connected to each other through a data network 1300. In the first embodiment, the data network 1300 is a storage area network (SAN), but may be an IP (Internet Protocol) network, or any of the other data communication networks.

The storage system 1000, a host computer 1100, and the managing computer 1200 are connected to each other through a managing network 1400. In the first embodiment, the managing network 1400 is the IP network, but may be the storage area network, or any of other data communication networks. Further, the data network 1300 and the managing network 1400 may be the same network, and the host computer 1100 and the managing computer 1200 may be provided by the same computer.

To simplify a description in FIG. 1, one storage system 1000, one host computer 1100, and one managing computer 1200 are shown. However, more one storage units 1000, host computers 1100, and managing computers 1200 may be used in the present invention.

The storage system 1000 includes a disk drive unit 1010 for storing data, a disk controller 1020 (processing part) for performing control within the disk drive unit 1010 and the storage system 1000.

The disk drive unit 1010 includes one or more disk drive 1011 and a disk drive power control circuit 1014. The disk drive 1011 includes a storing medium for storing various types of data. Each disk drive 1011 is controlled between ON and OFF of power independently from the other disk drives 1011. More specifically, the disk drive power control circuit 1014 has registers related to the disk drives 1011, respectively. Turning ON/OFF one of the registers (setting/resetting the register) turns the related disk drive 1011 ON/OFF.

The disk drives 1011 are arranged in an array to have a configuration of RAID (Redundant Array Inexpensive Disks). An assembly of disk drives 1011 forming the RAID is referred to as a parity group 1013. In the parity group 1013, more than one logical volume 1012 is made. Information regarding the configuration is managed with managing information group 1029 by a CPU (Central Processing Unit) 1023 (as a processing part) operating according to a micro-program 1028 (mentioned later) in a disk controller 1020.

The logical volume 1012 can be used for storing a data volume for storing data used by the host computer 1100, A part of the logical volumes 1012 are used to store the data volumes. If the CDP disclosed in U.S. patent application publication No. 20050015416 and the like is applied to the data volume, a plurality of data volumes, in which data to be protected is stored, are managed as a journal group.

In addition, the logical volume 1012 can be used for storing a journal volume that stores journals generated in response to data writing to the data volume included in the journal group. Relating the journal volume to a specific journal group causes a CPU 1023 operating according to the micro-program 1028 to store the journal of the related journal group in the related journal volume. Further, several journal volumes can be related to a single journal group.

In addition, the logical volume 1012 can be used for storing a snapshot volume that stores a plurality of copy images (snapshots) of the data volumes at certain timing. An assembly of snapshot volumes for storing a snapshot acquired at certain timing of all data volumes stored in a specific journal group is referred to as an SSVOL group. Relating the specific journal group to the SSVOL group causes the CPU 1023 operating according to the micro-program 1028 to acquire a snapshot at the certain timing as the related SSVOL group. Further the snapshot stored in the snapshot volume may be a full-backup of the data volume or a logical image such as a differential backup depending on a requirement for the system or a scale of the system.

Formation information relating to the CDP is also managed in the managing information group (tables) 1029 by the CPU 1023 operating according to the micro-program 1028 in the disk controller 1020 mentioned later. Here, the present invention is effective when there are a plurality of journal groups. However, the number of the journal groups may be any of one or more.

The disk controller 1020 includes a managing I/F (interface) 1021, a data I/F 1022, a disk drive I/F 1025, a main memory 1026, the CPU 1023, and a timer 1024.

The main memory 1026 includes a RAM (Random Access Memory), a ROM (Read Only Memory), and the like to store the managing information group 1029 and the micro-program 1028. The CPU 1023 executes the micro-program 1028 stored in the main memory 1026. The micro-program 1028 causes the CPU 1023 to control various functions such as backup and recovery with the journaling mentioned regarding the related art such as acquisition of a snapshot, generation of a journal, recovery with the journal and releasing the journal.

More specifically, generating and releasing operations of the journal are as follows:

A request from the host computer 1100 of writing in the data volume (the logical volume 1012) is processed by the CPU 1023 and the result appears in the data volume. In this event, the CPU 1023 generates the journal by adding appropriate meta data for management by operations such as assigning ordinal number in accordance with the order of transmission of the data in which the data to be written is written as an after-journal and the data to be over-written is written as a Before-journal. The CPU 1023 stores the journal in the journal volume related to the journal group to which the data volume belongs.

A destination of storing the journal is determined as follows:

A destination of storing the first journal is a top of the first journal volume in accordance with a using order of the journal volume mentioned later. A destination of the journals after that is an address next to an end of the journal just previously stored. If the journal cannot be fully stored in the destination, the journal is stored from a top of the next journal volume in accordance with the using order of the journals. Further, if the journal cannot be fully stored in the journal having a last using order, an oldest journal is released in an order of oldness in journal with repetition of release necessary for storing the journal to store the journal therein. The meta data and the ordinal number will be described later together with a configuration of the journals. Further, as another embodiment, the configuration may be made such that the CPU 1023 generates the journal of either of the BEFORE journals or the AFTER journals in a process responsive to a writing request from the host computer 1100.

An actual operation regarding acquiring a snapshot is outlined as follows:

The CPU 1023 operating according to the micro-program 1028 monitors an ordinal counter 5002 for a journal group table 10293 (see FIG. 4) mentioned later included in the managing information group 1029 and acquires a snapshot belonging to an SSVOL group related, when the counter 5002 indicates snapshot acquisition timing 5007 mentioned later. In this event, which one of a plurality of related SSVOL groups the snapshot is stored in is determined by indication of TRUE of a next using flag 8004 in an SSVOL group managing table 10296 (see FIG. 7) mentioned later.

In addition, will be described later a more specific outline of a recovering operation together with a configuration of the journal.

The micro-program 1028 causes the CPU 1023 to operate for providing a function for processing data input from and data output to the disk unit 1010 in response to a request from the managing computer 1200 or the host computer 1100, and a function for setting or providing control information within the storage system 1000. The CPU 1023 performs control to provide these functions with referring or updating the information in the managing information group 1029.

A configuration of the managing information group 1029 will be described later.

The timer 1024 is a general timer having a function providing current time. The timer 1024 is referred by the CPU 1023 operating according to the micro-program 1028 when the journal is generated and/or the snapshot is acquired.

The data I/F (interface) 1022 is an interface circuit for the data network 1300 with one or more communication port. The disk controller 1020 receives and transmits data and/or control instruction from and to the host computer 1100 and other storage systems (not shown in FIG. 1) through the port. The managing I/F is an interface circuit for the managing network 1400 to receive and transmit data and/or control instructions from and to the host computer 1100 and the managing computer 1200. The disk I/F 1025 is an interface circuit for the disk unit 1010 to receive and transmit the data and the control instructions from and to the disk unit 1010.

The host computer 1100 includes an input unit 1140 such as a keyboard and a mouse, a CPU 1130, a display unit 1120 such as a CRT (Cathode Ray Tube), and a memory 1160, a data I/F 1110, and a managing I/F 1150.

The data I/F 1110 is an interface circuit for the data network with one or more communication port. The host computer 1100 receives and transmits the data and the control instructions to and from the storage system 1000 through the communication port. The managing I/F 1150 is an interface circuit for the managing network 1400 to receive and transmit data and control instructions from and to the managing computer 1200 and the storage system 1000 for system management.

The memory 1160 stores applications 1161 and a recovery manager 1162. The CPU 1130 provides various functions by executing various programs stored in the memory 1160.

The application 1161 is an application which uses the logical volumes 1012 as data volumes for data storing, for example, a DBMS (Database Management System) or a file system.

The CPU 1130 operating according to the recovery manager 1162 makes a request for acquiring a snapshot for the storage system 1000 and a recovery request of data at certain timing. The recovery manager 1162 provides a command line interface (hereinafter referred to as CLI) and the like as an interface so as to make a manager and/or the other programs to execute these functions.

The managing computer 1200 includes an input unit 1240 such as a keyboard and a mouse, a display unit 1220 such as a CRT, a memory 1250, and a managing I/F 1210.

The managing I/F 1210 receives and transmits data and control instructions from and to the host computer 1100 and the storage system 1000 for the system management.

The memory 1250 stores a setting program 1251, a journal monitoring program 1252, and a group managing information group (tables) 1253. The CPU 1230 provides various functions by executing the various programs stored in the memory 1250.

The setting program 1251 is provided for setting values in the group managing information group 1253 and the managing information group 1029. Further, to set the values in the managing information group 1029, the CPU 1230 communicates with the CPU 1023 operating according to the micro-program 1028.

With referring and updating information in the group managing information group 1253, the journal monitoring program 1252 monitors which one of journal volumes each journal group stores the journal in, to control a storing destination of storing the journal (storing destination) in each journal group of which storing destinations of journals are to be linked.

In addition, these two programs 1251 and 1252 provide a CLI or the like as an interface to cause the manager or other programs to execute these programs.

The group managing information group 1253 will be described later.

FIGS. 2 to 8 are tables included in the managing information group 1029 (see FIG. 1).

FIG. 2 is an example of a parity group formation table 10291 for managing formation information of parity groups. A Disk_ID 3001 of a field stores identifiers of the disk drive 1011 in the storage system 1000. More specifically, when the disk drive 1011 is installed in the storage system 1000, the CPU 1023 operating according to the micro-program 1028 sets the value. A capacity 3002 of a field stores capacities of the disk drive 1011 indicated by the Disk_ID 3001. When the disk drive 1011 is installed in the storage system 1000, the CPU 1023 operating according to the micro-program 1028 reads a capacity of the disk drive 1011 from the disk drive 1011 to set a value of the capacity.

A PG_ID 3003 of a field stores identifiers of parity groups each indicating the identifier of the parity group to which a disk drive 1011 indicated by the Disk_ID 3001 belongs. The value is set when a manager generates the parity group with the CLI provided by the setting program 1251. For example, the manager can issues a command of "create PG -Disk_ID Disk_1, Disk_2, Disk_3, Disk_4-level 5". This command means to "form a parity group of RAID 5 using the disk drives of Disk_1, Disk_2, Disk_3, and Disk_4, The CPU 1023 receiving the command forms the parity group according to the micro-program 1028, assigns the identifier having a value unique in the storage system 1000, and sets the identifier in the PG_ID 3003 for the disk drives forming the parity group.

In addition, to make the setting, the CPU 1230 operating according to the setting program 1251 performs communication with the CPU 1023 operating the micro-program 1028. The communication is established with an IP address as a connection destination registered in setting information (not shown) of the setting program 1251.

Hereinafter, when the CPU 1230 performs the communication with the CPU 1023 operating according to the micro-program 1028, the communication is carried out after establishment of the communication as described above.

FIG. 3 shows an example of a logical volume table 10292 for managing formation information of the logical volumes. An LU_ID 4001 of a field stores identifiers of the logical volumes 1012. A storage size 4002 of a field stores storage size of logical volumes 1012 indicated by the LU_ID 4001. A PG_ID 4003 of a field stores identifiers of parity groups to which the logical volume 1012 indicated by the LU_ID 4001 belongs.

These values are set in response to that the manager generates the logical volume 1012 with the CLI provided by the setting program 1251. For example, the manager can issue a command of "create LU -PG_ID PG_1 size 20 G" and the like. This is a command for generating an LU having a size of 20 GB from the parity group of the PG_1. The CPU 1023 receiving the command generates the logical volume 1012, assigns the identifier uniquely identifiable in the storage system 1000 to the logical volume 1012 and sets the identifier in the field of LU_ID 4001 20 G in a field of storage size 4002, and PG_1 in the filed of PG_ID 4003 according to the micro-program 1028.

FIG. 4 shows an example of a volume table 10293 for managing information of the journal groups.

A JNLG_ID 5001 of a field stores identifiers of the journal groups. The value is set in response to that the manager generates the journal group with the CLI provided by the setting program 1251. For example, the manager can issue a command such as "Create JG -jgid JNLG_1". This is a command for preparing a journal group JNLG_1. A value indicating "JNLG_1" is stored in the JNLG_ID 5001."

The ordinal counter 5002 stores a number for managing an order of acquiring the journal and the snapshot. This value is zero as an initial value and one is added to the current value by the CPU 1023 operating according to the micro-program 1028 whenever the journal is generated in response to a writing request from the host computer 1100. The value after addition is copied in the field of the ordinal number 10005 of the journal (see FIG. 9) described later. Further, the number is copied by the CPU 1023 in the ordinal number 10005 in an SSVOL group managing table 10296 (see FIG. 7) mentioned later.

This process records an ordinal relation between generating timing of each journal and the acquiring timing of the snapshot. When recovering, the CPU 1023 operating according to the micro-program 1028 specifies the journals to be applied to the base snapshot using the ordinal relation and an applying order thereof. More specifically, when recovering by applying the AFTER journal to a specific snapshot, the CPU 1023 applies the journals having ordinal numbers of which values are larger (later) than that of the corresponding snapshot and smaller (earlier) than the journal having the recovery point specified to the corresponding snapshot according to increase in the ordinal numbers. On the contrary, if the BEFORE journal is applied to a specific snapshot, the CPU 1023 applies the journals having ordinal numbers of which values are smaller (earlier) than that of the corresponding snapshot and larger (later) than the journal having the recovery point specified to the corresponding snapshot in order from the ordinal number having a large number.

A latest JNL storing VOL_ID 5003 of a field stores identifiers of the journal volumes in which the latest journals are stored. The latest JNL storing address 5004 of a field stores addresses in which the latest journals in the corresponding journal volumes are stored.

An oldest JNL storing VOL_ID 5005 of a field stores identifiers of the journal volumes stored in the corresponding oldest journals. The oldest JNL storing address 5006 stores addresses in which the corresponding oldest journals are stored in the corresponding journal volumes.

The latest JNL storing address 5004, the latest JNL storing address 5004, the oldest JNL storing VOL_ID 5005, the oldest JNL storing address 5006 are referred and updated by the CPU 1023 operating according to the micro-program 1028 to specify a storing destination volume and an address of a new journal or a to-be-deleted journal.

A snapshot acquisition timing 5007 of a field stores timing for acquiring snapshots. In the first embodiment, this is the number of journals stored from when the just before snapshot is acquired. The value is set by the manager with the CLI provided by the setting program 1251. For example, the manager can issue a command such as "setSSInterval 3000 -jgid JNLG_1." This is a command for acquiring a snapshot whenever 3000 journals are stored in the "journal group JNLG_1." The value of 3000 is stored at the snapshot acquisition timing corresponding to JNLG_1.

FIG. 5 is an example of the data volume table 10294 for managing data volume information forming the journal group. A JNLG_ID 6001 of a field stores identifiers of the journal groups. A data volume ID 6002 of a field stores identifiers of the logical volume 1012 (data volume) belonging to the corresponding journal group.

These values are set in response to addition of the data volume to the journal group using by the manager the CLI provided by the setting program 1251. For example, the manager can issue a command of "addDataVOL -jgid JNLG_1-datavolid LU_11." This is a command to "add a data volume LU_11 to the journal group JNLG_1." The JNLG_1 is stored in the JNLG_ID 6001, and LU_11 is stored in the data volume ID 6002, Further, if a plurality of the data volumes are set in a single journal group, the command is executed several times.

FIG. 6 is an example of a snapshot volume managing table 10295 for managing information of the snapshot forming the SSVOL group. An SSVOL group ID 7001 of a field stores identifiers of the SSVOL groups to be managed. A snapshot volume ID 7002 of a field stores identifiers of logical volumes 1012 (snapshot volume) belonging to the SSVOL group to be managed. A corresponding data volume ID 7003 of a field stores identifiers of data volumes of targets of snapshot acquisition.

These values are set in response to addition of the logical volume 1012 to an SSVOL group as a snapshot volume by the user with the CLI provided by the setting program 1251.

For example, the manager issues a command of "addSS-VOL -ssvolgid SSG_1 -ssvolid LU_21 -source LU_11." This is a command to "add a snapshot volume LU_21 for storing the snapshot of the data volume LU_11 in the SSVOL group SSG_1." The SSC_1 is stored in the SVOL group ID 7001, the LU_21 is stored in the snapshot volume ID 7002, and the LU_11 is stored in a corresponding data volume ID 7003.

FIG. 7 is an example of an SSVOL group managing table 10296 for managing relating the journal group to the SSVOL group. A JNLG_ID 8001 of a field stores identifiers of the journal groups to be managed. An SSVOL group ID 8002 of a field stores identifiers of the SSVOL groups for storing the snapshots of the journal groups indicated by the JNLG_8001. A using order 8003 of a field stores orders that the SSVOL groups indicated by the SSVOL group ID 8002 store the snapshots.

These values are set by relating the SSVOL group to the journal group by the manager using the CLI provided by the setting program 1251.

For example, the manager issues a command of "addSS-VOLG -jgid JNLG_1 -ssvolgid SSG_1." This is a command to "relate the SSVOL group SSG_1 to the journal group JNLG_1" for the storage system 1000. The JNLG_1 is stored in the JNL group ID 8001 and a value of SSG_1 is stored in the SSVOL group ID 8002. Further, the using order 8003 stores a value as a result of adding one to a maximum value of the using order 8003 of a record having the same value as a value of the SSVOL group ID 8002 set by the command. In this event, if there is no record having the same value, one is stored. In addition, by executing this a plurality of times after the identifier of the SSVOL group of the command mentioned above is changed, a plurality of the SSVOL groups is related to the journal group.

A next using flag 8004 of a field stores flags indicating the SSVOL group for storing the snapshot next. The ordinal number 8005 of a field stores the number indicating an ordinal relation between the acquisition timing of the snapshot stored in the SSVOL group indicated by the SSVOL group ID 8002 and journal generating timing.

Whenever the CPU 1023 operating according to the microprogram 1028 stores the snapshot in the SSVOL group having a value of the next using flag 8004 of "TRUE", the CPU 1023 sets the value of the ordinal counter 5002 in the ordinal number 8005, sets the value of the next using flag 8004 to "FALSE", and sets "TRUE" in the next using flag 8004 of the SSVOL group for storing the next snapshot.

Acquisition time 8006 of a field stores time when a snapshot acquisition request reaches the storage system 1000. The CPU 1023 acquires current time from the timer 1024 in the disk controller 1020 and sets the current time in the acquisition time 8006. Further, as modification, the acquisition time 8006 may store a request issuing time included in the snapshot acquisition request. For example, in a main-frame circumstance, a plurality of main frame hosts share a timer which can provide time when the snapshot acquisition request is issued. Thus, this timer can be used also.

FIG. 8 is an example of a journal volume table 10297 for managing information of the journal volumes used in the journal group. A JNLG_ID 9001 stores an identifier of the journal group. A JNL volume ID 9002 of a field stores identifiers of the logical volumes 1012 used as the journal volumes used in the journal group indicated by JNLG_ID 9001. A using order 9003 of a field stores an order used for storing the journal by the journal volume indicated by the JNL volume ID 9002.

These values are set by adding a journal volume to the journal group by the manager with the CLI provided by the setting program 1251.

For example the manager issues a command such as "addjVOL -jgid JNLG_1 -jvolid LU_31." This is a command to "add the journal volume LU_31 to the journal group JNLG_1 for the storage system 1000. The JNLG_1 is stored in the JNLG_ID 9001, and LU_31 is stored in the JNL volume ID 9002. Further, the using order 9003 stores values obtained as a result of adding one to a maximum value of the using order 9003 of a record having the same value as the JNLG_ID 9001 set by the command. In this event, if there is no record having the same value, one is stored. In addition, by executing this a plurality of times after the identifier of the logical volume 1012 is used as the journal volume of the above-described command is changed, a plurality of journal volumes are added to the journal group.

A start time 9004 of a field stores acquisition time of the oldest journal which the journal volume indicated by the JNL volume ID 9002 stores. End time 9005 of a field stores acquisition time of the latest journal stored by the journal volume indicated by the JNL volume ID 9002. Regarding these values, when changing the journal storing destination, the CPU 1023 sets generation time 10004 (see FIG. 9 mentioned later) of the oldest journal stored in a top of the journal within the journal volume of an origin of storing destination change in the start time 9004 and sets a value of the generation time 10004 of the newest journal stored just before the storing destination change in the end time 9005.

A used storage size 9006 stores a total storage size of the journals stored in the journal volumes indicated by JNL volume ID 9002. This value is subject to addition of a value of the storage size of the journal whenever the journal is stored in the journal volume indicated by the JNL volume ID 9002. In addition, if the journal volume indicated by the JNL volume ID 9002 becomes a new storing destination when a change of the journal storing destination occurs, this value is reset to zero.

FIG. 9 is an example of the journal formation in the first embodiment (occasionally see other drawings).

A data volume ID 10001 of a field stores the identifier of the data volume to which the journals are applied. An applying destination address 10002 of a field stores an address of the journal applied in the data volume indicated by the data volume ID 10001. A data length 10003 of a field stores a length of the journal to be applied, i.e., lengths of the AFTER journal 10006 and the BEFORE journal 10007. These values are set in response to a writing request from the host computer 1100 when the CPU 1023 generates the journal.

A generation time 10004 of a field stores time when the writing request from the host computer 1100 reaches the storage system 1000. A value of the generation time 10004 is set after the CPU 1023 acquires the time from the timer 1024 in the disk controller 1020. As a modification, the generation time 10004 may be determined by a writing request issuing time included in the writing request.

The ordinal number 10005 of a field stores a number indicating an ordinal relation between the acquisition timing of the snapshot and the generation timing of the journal. When generating the journal, the CPU 1023 sets a value resulting from adding one to the value in the ordinal counter 5002.

An AFTER journal 10006 of a field stores data of the AFTER journal. A BEFORE journal 10007 of a field stores data of the BEFORE journal.

A next journal volume ID 10008 and a next journal address 10009 store information for identifying storing locations of the journal generated next to the corresponding journal (hereinafter referred to as "next journal"). A next journal volume ID 10008 of a field stores an identifier of the journal volume for storing the next journal. A next journal address 10009 stores an address of the next journal within the journal volume indicated by the next journal volume ID 10008. This value is set after the CPU 1023 determines a storing location of the next journal according to a method mentioned above.

A prior journal volume ID 10010 of a field and a prior journal address 10011 of a field store information of storing locations of journals generated just before the corresponding journal (hereinafter referred to as "BEFORE journal"). A prior journal volume ID 10010 of a field stores an identifier of the journal volume in which the prior journal is stored. A prior journal address 10011 of a filed stores an address in which the prior journal is stored in the journal volume indicated by the prior journal volume ID 10010. When generating the journal, the CPU 1023 copies values of the latest JNL storing VOL_ID 5003 (see FIG. 4) and the latest JNL storing address 5004 into values of the prior journal volume ID 10010 and the prior journal address 10011. After that, the CPU 1023 sets the storing location of the generated journal in the latest JNL storing VOL_ID 5003 and the latest JNL storing address 5004.

FIGS. 10 to 12 show tables forming the group managing information group 1253.

FIG. 10 is an example of a JNL storing destination linking managing table 12531 for managing information of the journal group of which journal storing destination is to be linked.

A managing ID 11001 of a field stores managing identifiers of groups of journal groups (a linking managing group) of which storing destinations of the journals are to be linked. A JNLG_ID 11002 of a field stores identifiers of the journal groups belongs to the linking managing group. A JNLVOL total size 11003 of a field stores a storage size of the journal volume required by the journal group indicated by the JNLG_ID 11002. A next partition power ON timing (a threshold for determining the timing) 11004 of a field stores timing when a partition in which a next journal is to be stored is turned on. In addition, in the first embodiment, the parity group is dealt as a partition. Further, the threshold is determined as a remaining storage size capable of storing the journal in the partition currently storing the journal.

These values are set by that the manager registers the journal groups of which journal storing destination is linked with the CLI provided by the setting program. For example, the manager issues a command such as "addJNLG -jgid JNLG_1 -jnlvolsize 30 G -event 100 M -targetID Group_1." This means a command for the storage system 100 for linking the journal group JNLG_1 to other journal groups belonging to the Group_1 to control the journal storing destination. In addition, this is the command for acquiring a storage size of the journal volume of 30 G to be used in the journal group JNLG_1. The Group_1 is stored in the managing ID 11001, the JNLG_1 is stored in the JNLG_ID 11002, and "30 G" is stored in the JNLVOL total size 11003. Further, the next partition power on timing 11004 stores 100 M bytes as a default value. However, this value can be changed by the manager with the CLI provided by the setting program 1251.

FIG. 11 is an example of a partition managing table 12532 for managing partitions used in the linking managing group in which the journal storing destination is managed. A managing ID 12001 of a field stores identifiers of the linking managing group in which the journal storing destination is to be linked. A partition ID 12002 stores identifiers of the partitions used in the linking managing group indicated by the managing ID 12001.

These values are set by that the manager adds an unused partition (parity group) to the journal groups of which journal storing destination is linked. For example, the manager issues a command such as "addPG -targeted Group_1 -partition_ID PG_01." This commands the storage system 1000 to "add a parity group PG_01 to the linking managing group Group_1 in which the journal storing destinations are linked." The Group_1 is stored in the managing ID 12001 and the PG_01 is stored in the partition ID 12002.

A presence-or-absence of assignment 12003 of a field stores flags each indicating whether the journal volume belonging to the partition indicated by the partition ID 1002 is assigned to the journal group. More specifically, when the presence-or-absence of assignment 12003 indicates the presence of assigning, "TRUE" is stored, and when indicating the absence of assigning, "FALSE" is stored. The value is set when the CPU 1230 operating according to the setting program 151 assigns the journal volume. This operation will be described later.

FIG. 12 shows an example of a managing group table 12533 for managing information of the linking managing group in which the journal storing destination is linked. A managing ID 13001 of a field stores the identifiers of the linking managing groups in which the journal storing destination is to be linked. A monitoring period 13002 of a field stores periods of monitoring the journal storing destinations of the journal groups belonging to the linking managing group indicated by the managing ID 13001.

These values are set by that the manager registers a period of monitoring the journal storing destination with the CLI provided by the setting program 1251. For example, the manager issues a command such as "set MonitorInterval -interval 10 sec -target Group_1." This is a command to "monitor the journal storing destination of the linking managing group Group_1 in which the journal storing destinations are linked." The Group_1 is stored in the managing ID13001, and "10 sec" is stored in the monitoring period 13002.

A currently-in-use partition 13003 of a field stores an ID of a partition, to which the journal volume of the journal storing destination for the journal group belonging to the linking managing group indicated by the managing ID 13001 belongs. The value is set by the CPU 1230 operating according to the journal monitoring program 1252. This operation will be described later.

(2) Operation in the First Embodiment

Next an operation of the first embodiment will be described.

Figure 13:
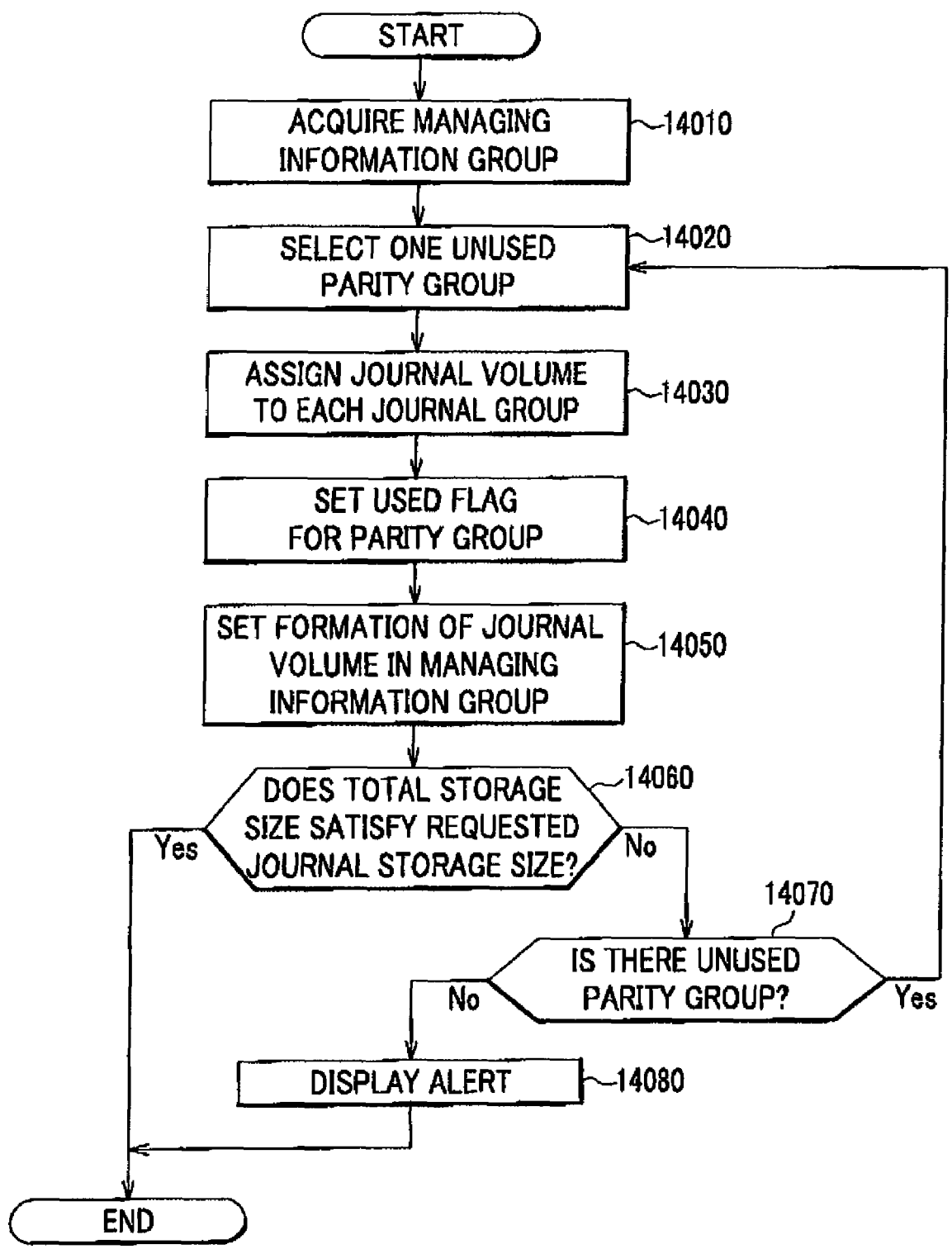
FIG. 13 shows an example of a journal volume assigning process according to the first embodiment.

FIG. 13 shows a flowchart in which the CPU 1230 assigns a journal volume to the journal group (occasionally see other drawings). The manager starts this process with the CLI provided by the setting program 1251. For example, the manager issues a command such as "setJNLVol Group__1." This is a command to "assign the journal volume to the journal group included in the journal group Group_1 of which journal storing destinations are linked."

When this process is started, first, the CPU 1230 acquires the managing information group 1029 from the CPU 1023 (a step 14010).

Next, the CPU 1230 selects one unused parity group from the journal group assigned to the specified linking managing group (a step 14020). More specifically, one of parities is selected in which the presence-or-absence of assignment 12003 is "FALSE" with reference to the partition managing table 12532.

Next, the CPU 1230 assigns the journal volume to each journal group belonging to the specified linking managing group (a step 14030). A method of assigning is arbitrary, but preferably, assignment is made such that a total storage size of the journal volume assigned to respective journal groups is near a ratio of requested journal size.

Next, the CPU 1230 sets the presence-or-absence of assignment 12003 as "TRUE" indicating that the logical volume 1012 belonging to the corresponding parity group has been assigned as the journal volume (a step 14040).

Next, the CPU 1230 sets the journal volume assigned to each journal group in the managing information group 1029 (a step 14050). Here, the CPU 1230 sets the journal volume assigned in the step 14030 with the CLI provided by the setting program 1251. This makes the using order 9003 (see FIG. 8) of the registered journal volumes continuous in each parity group. As a result, this assures that the journal volumes in the same parity group are continuously used, as long as the journal storing destination is not changed compulsorily.

Next, the CPU 1230 judges whether a total storage size of the journal volumes assigned to each journal group satisfies the requested journal storage size with reference to the linking managing group table 12531 (a step 14060). If satisfied (Yes), the process is finished. If not satisfied (NO), the process proceeds to a step 14070.

In the step 14070, the CPU 1230 judges whether there is an unused parity group among the parity groups assigned to the specified linking managing group (a step 14070). If there is an unused parity group (Yes), the process returns to the step 14020 to perform the journal volume assigning again. If there is no unused parity group (No), because the requested journal storage size cannot be satisfied, an error (alerting) is displayed as a result of the process (a step 14080), and then the process is finished.

This is the flow of assigning the journal volumes to the journal group.

Figure 14:
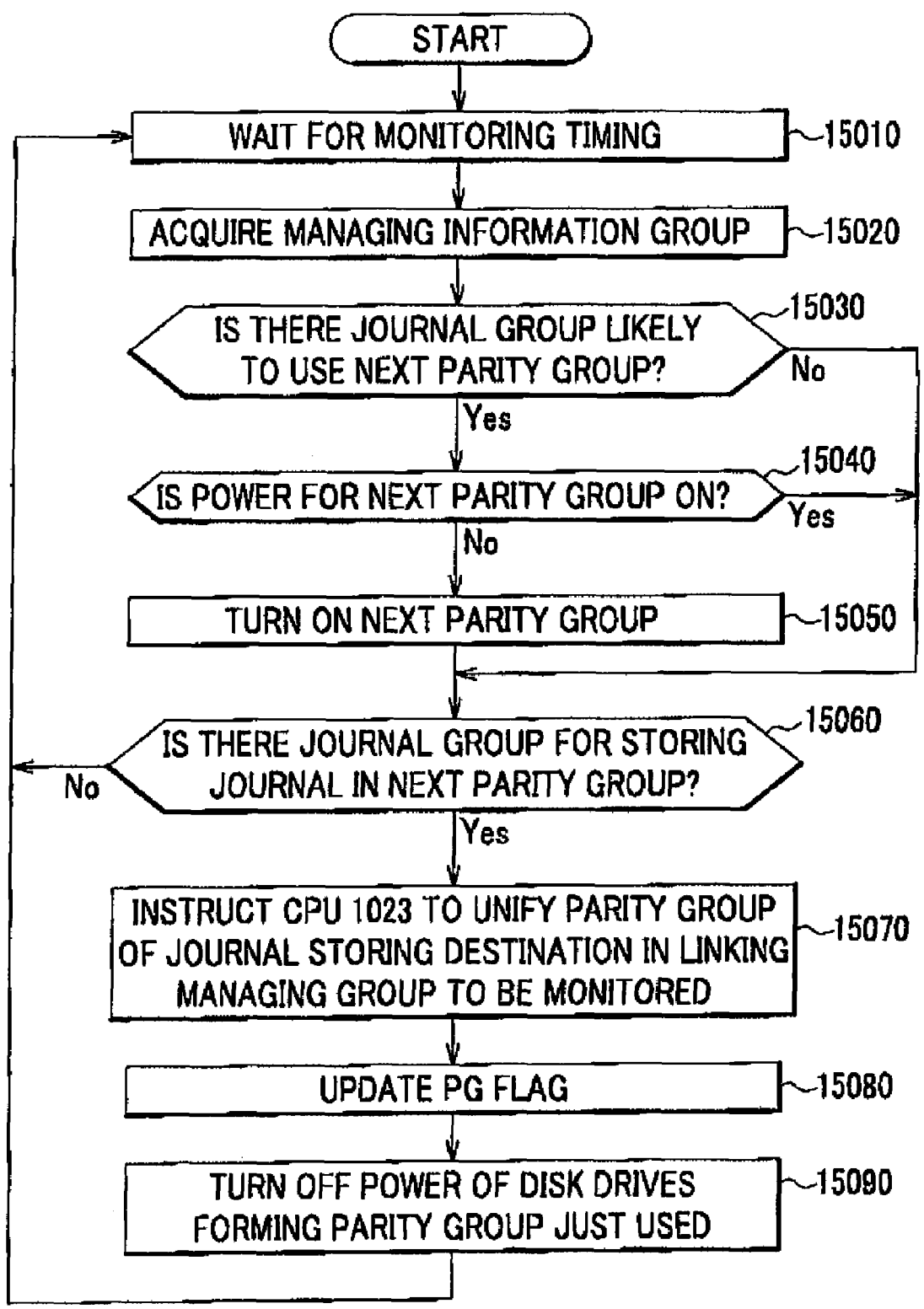
FIG. 14 shows an example of a journal storing destination monitoring and controlling process according to the first embodiment.

FIG. 14 shows a flow of a process for such a control that the CPU 1230 monitors the journal storing destination of each journal group, and when the journal storing destinations are dispersed, the journal storing destinations are localized (occasionally see other drawings). The manager starts the process with the CLI provided by the setting program 1251. For example, the manager issues a command such as "runMonitor Group_1." This is a command to "start monitoring and controlling the journal storing destination of the linking managing group of Group_1 of which journal storing destinations are linked."

When this process is started, first, the CPU 1230 waits for the timing of monitoring (a step 15010). The timing of monitoring is set in the monitoring period 13002.

Next, the CPU 1230 acquires the managing information group 1029 from the CPU 1023 (a step 15020).

Next, the CPU 1230 checks whether there is a journal group which is likely to store the journal in the parity group which is different from the parity group which is a current journal storing destination (a step 15030). Here, a sum of a total of the storage sizes 4002 of the journal volumes, belonging to the same parity group as the journal volume currently storing the journal, having a larger value of the use order that the journal volume currently storing the journal and a value obtained by subtracting a used storage size 9006 from the storage size 4002 of the journal volume in which the journal is currently stored is compared with the next partition power ON timing 11004.

If the former is smaller (Yes in the step 15030), i.e., if there is a journal group which is likely to use the next parity group, the process proceeds to a step 15040. If the former is not smaller (No, in the step 15030), i.e., there is no journal group which is likely to use the next parity group, the process proceeds to a step 15060.

In the step 15040, the CPU 1230 checks whether a power for the disk drives forming the parity group which is likely to next start to store the journal is ON. This is done by inquiring the disk power control circuit 1014. The disk drive power control circuit 1014 receiving the inquiring returns a status information in the register for controlling the power between ON and OFF. As a result of this, if the power is ON (Yes in the step 15040), the process proceeds to the step 15060. If the power is not ON (No in the step 15040), the CPU 1230 transmits an instruction to the disk power control circuit 1014 to turn the disk drive forming the parity group ON in a step 15050. After that, the process proceeds to a step 15060.

In the step 15060, the CPU 1230 checks whether there is a journal group which stores the journal in a parity group other than that indicated by the currently-in-use partition 13003. If there is no such a journal group (No), the process proceeds to a step 15010. If there is such a journal group (Yes), the process proceeds to a step 15070.

In the step 15070, the CPU 1230 request the CPU 1023 to unify the parity group of the journal storing destination by changing the journal destination of the journal group in which the journal is being stored in the currently-in-use partition 13003 to a top journal volume of the next parity group. Further, changing the journal storing destination to the next parity group means that a first journal volume belonging to a parity group other than the parity group in which the journal is currently stored is searched in accordance with the using order 9003, and the journal storing destination is changed to the searched volume. In other words, this results in that the journal volume belonging to the currently-in-use partition 13003 is skipped without using. An operation of the CPU 1023 receiving the switching request will be described later.

Next, the CPU 1230 updates the flag of the currently-in-use partition (parity group) 13003 so as to indicate the next parity group to reflect a status after switching (a step 15080).

Next, the CPU 1230 transmits an instruction to the disk drive power control circuit 1014 to turn OFF the power of the disk drives forming the parity group just previously used (a step 15090). After that, the process proceeds to the step 15010.

This is the flow of the CPU 1230 operating according to the journal monitoring program 1252.

In the first embodiment, for a change of the parity group of the journal storing destination for a single journal group, the journal storing destination of all journal groups in the link managing group to be monitored are linked. However, a condition may be set such that the change is not made until the parity group indicated by the currently-in-use partition 13003 is used up to a predetermined storage size. In this case, just after the result of "Yes" in the step 15060, a step is added to judge the condition mentioned above. This provides an efficient use of the journal volumes.

In addition, in the first embodiment, when the journal storing destination of all journal groups in the link managing group to be monitored are linked for the change of the parity group of the journal storing destination for a single journal group, there may be a case that the storage size for the journal volume may fail to satisfy the requested journal volume storage size depending on the journal group. To avoid this, a modification may provide dynamically assigning the journal group.

Figure 15:
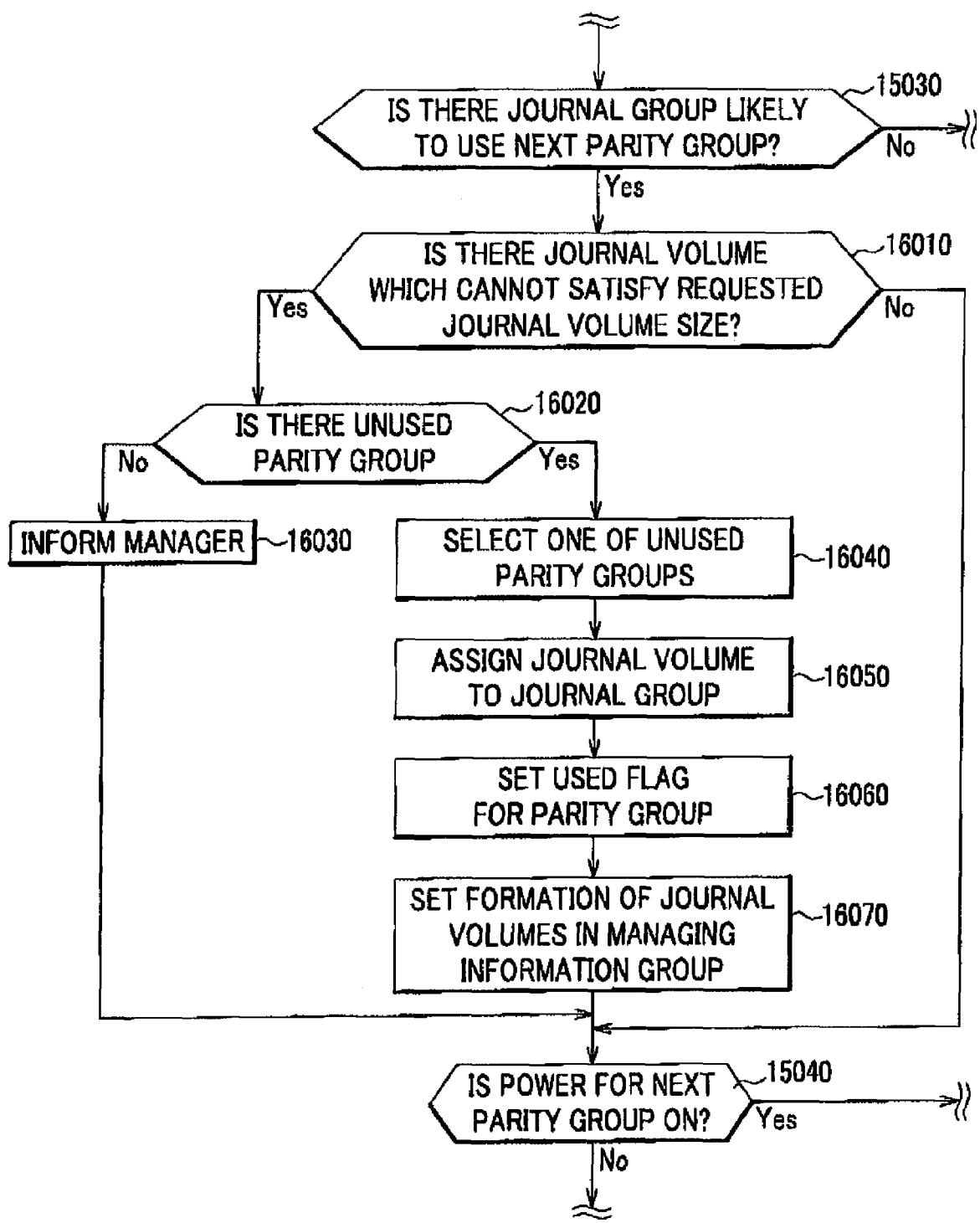
FIG. 15 shows another example of a journal storing destination monitoring and controlling process according to the first embodiment.

To establish this, a new step is added between the steps 15030 and 15040 described with reference to FIG. 14. FIG. 15 shows the added step.

In a step 15030, if there is a journal group which is likely to store the journal in a parity group different from the parity group which is currently a journal storing destination (Yes), the CPU 1230 checks whether there is a journal volume which has not used the requested journal volume size at the present moment in the linking managing group of journal groups to be monitored (step 16010). This can be done by comparing the total of the used storage size 9006 with the JNLVOL total size 11003. If No, processing proceeds to a step 15040. If Yes, the processing proceeds to a step 16020.

In the step 16020, the CPU 1230 checks whether there is an unused parity group assigned to the linking monitoring group of the journals to be monitored. If there is no unused parity group (No), because the requested storage size of the journal volume cannot be satisfied, the CPU 1230 informs the manager (a step 16030) and the process proceeds to a step 15040. Further, in this case, because processing is executed under a condition that the storage size for storing the journal is less than the remaining storage size requested by the manager, the informed manager should assign an unused parity group to the linking managing group of the journals to be monitored.

On the other hand, if one or more unused parity group is left (Yes in the step 1602), the process proceeds to a step 16040.

In the step 16040, the CPU 1230 selects one of the unused parity groups. This is equivalent to the process in the step 14020.

Next, the CPU 1230 assigns the journal volume to each journal group belonging to the specified linking managing group of the journal groups (a step 16050). This corresponds to the process in the step 14030 mentioned above.

Next, the CPU 1230 sets the presence-or-absence of assignment 12003 is set as "TRUE" to indicate that the logical volume 1012 belonging to the corresponding parity group has been assigned as the journal volume (a step 16060). This corresponds to the process in the step 14040.

Next, the CPU 1230 sets the journal volume assigned to each journal group in the managing information group 1029 (a step 16070). This corresponds to the step 14050. After this step, the process proceeds to the step 15040 to return to the flow described with reference to FIG. 14.

As mentioned above, if any of the journal groups which cannot satisfy the requested storage size of the journal volume in the linking managing group of the journal volume to be monitored during operation occurs, dynamically assigning the journal volume can satisfy the requested journal volume size.

Figure 16:
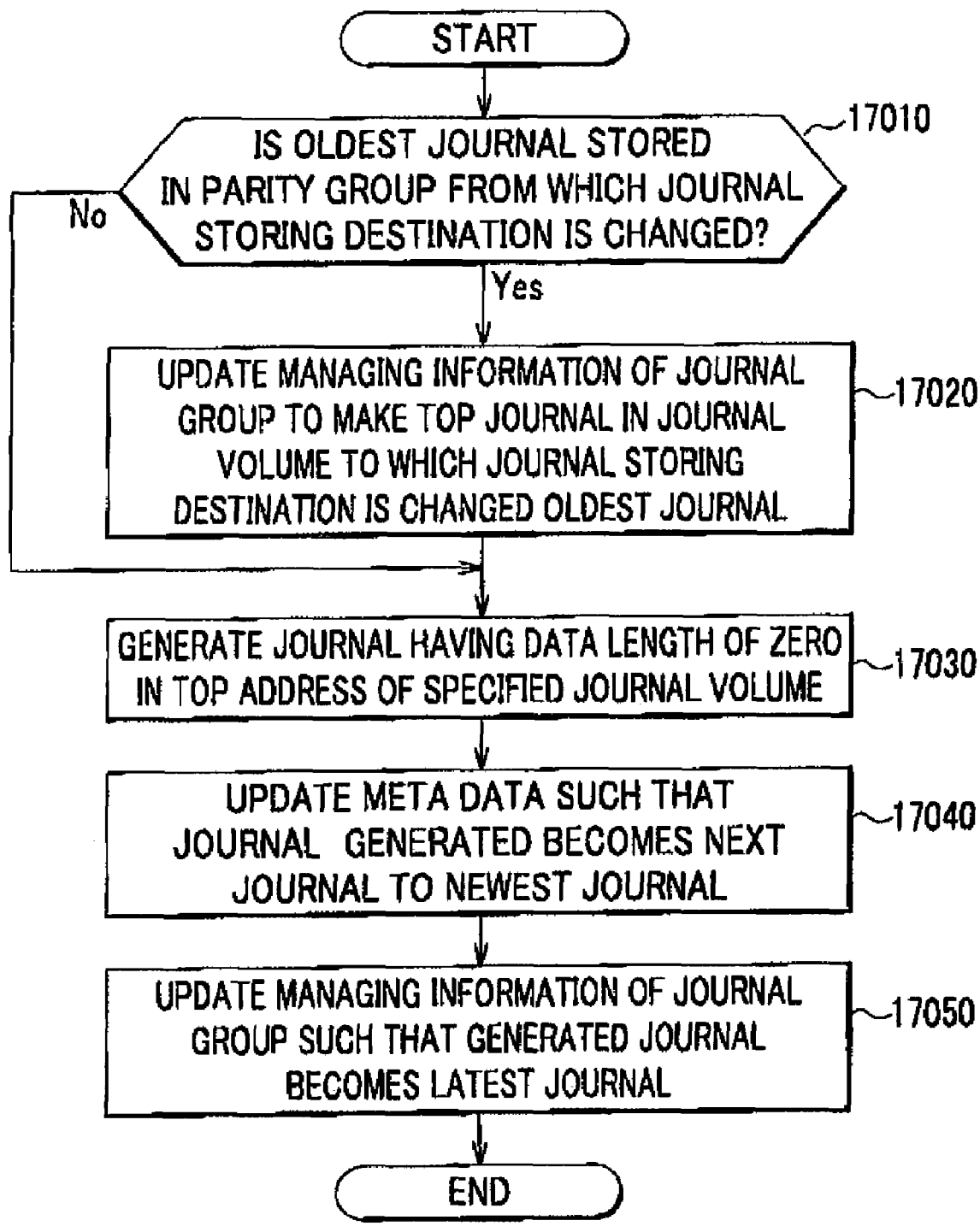
FIG. 16 shows an example of a journal storing destination changing process according to the first embodiment.

Returning to FIG. 14, a flow of the CPU 1023 receiving the instruction of changing the journal volume of the journal storing destination from the CPU 1230 operating according to the journal monitoring program 1252 in the step 15070 will be described with reference to FIG. 16.

When receiving the instruction of the change of the journal volume of the journal storing destination from the CPU 1230 operating according to the journal monitoring program 1252, the CPU 1023 checks whether the oldest journal is stored in the parity group from which the journal storing destination is changed (a step 17010). More specifically, the CPU 1023 checks whether the journal volume indicated by the oldest JNL storing VOL_ID 5005 belongs to the same parity of the latest JNL storing VOL_ID 5003. If the oldest journal is not stored in the parity group from which the journal storing destination is changed (No), the process proceeds to the step 17030. If the oldest journal is stored in the parity group from which the journal storing destination is changed (Yes), the process proceeds to the step 17020.

In the step 17020, the CPU 1023 updates the managing information of the journal group such that the journal stored in the top address of the journal volume to which the journal storing destination is changed is determined as an oldest journal of the journal group. More specifically, the identifier of the journal volume (logical volume 1012) to which the journal storing destination is changed is set as the oldest JNL storing VOL_ID 5005, and the oldest JNL storing address 5006 is set to zero.

Next, the CPU 1023 generates a journal having a data length of zero and stores in a top address of the journal volume to which the journal storing destination is changed (a step 17030). In this event, if the oldest journal is stored in the top address of the journal volume to which the journal storing destination is changed, the oldest journal is deleted in the order of oldness to secure a sufficient storage size for storing the generated journal. The deleting process is well-known.

Next, the CPU 1023 updates the meta data of the journal such that the journal generated in the step 17010 becomes a next journal to the newest journal (a step 17040). More specifically, in the next journal volume ID 10008 and the next journal address 10009 of the journal stored at a location indicated by the latest JNL storing VOL_ID 5003 and the latest JNL storing address 5004, values are set to indicate the storing location of the generated journal. In addition, in the prior journal volume ID 10010 of the generated journal a value of the latest JNL storing VOL_ID 5003 is set, and in the prior journal address 10011, a value of the latest JNL storing address 5004 is set.

Next, the CPU 1023 updates the managing information such that the generated journal becomes the latest journal (a step 17050). More specifically, in the latest JNL storing VOL_ID 5003 and the latest JNL storing address 5004, values of a storing location of the generated journal.

As mentioned above, the CPU 1023 operates in response to the instruction of changing the journal volume of the journal storing destination.

As mentioned above the first embodiment is described. According to the first embodiment, the journal storing destination in the journal group belonging to the journal group to be monitored can be linked, so that the journal storing destinations at a certain time can be localized over a plurality of the journal groups. Further, as a result, a function for managing an attribution for each assembly of specific logical volumes or an assembly of specific physical volumes can be applied to the journal management at a specific time zone. More specifically, in the first embodiment, an example is described in which the power of the disk drives forming the parity group having no possibility of storing the journal is turned OFF.

Second Embodiment

Next, a computer system according to a second embodiment will be described using an external connection technology for configuring a system in which a plurality of storage systems are integrated, disclosed in U.S. patent application publication No. 20040257857, which is incorporated herein by reference (corresponding Japanese application is Japanese Laid-open patent application publication No. 2005-011277).

In the computer system according to the second embodiment, a first storage system virtualizes the logical volume 1012 of the second storage system with an externally connecting function to use in the first storage system the virtualized volume as the journal volume. In this case, if the journal storing destination is determined irrespective of the journal generation time, the problem in power saving in the disk drives also occurs. Then, it will be described that the present invention is also applicable to this configuration.

(1) System Configuration According to the Second Embodiment

Figure 17:
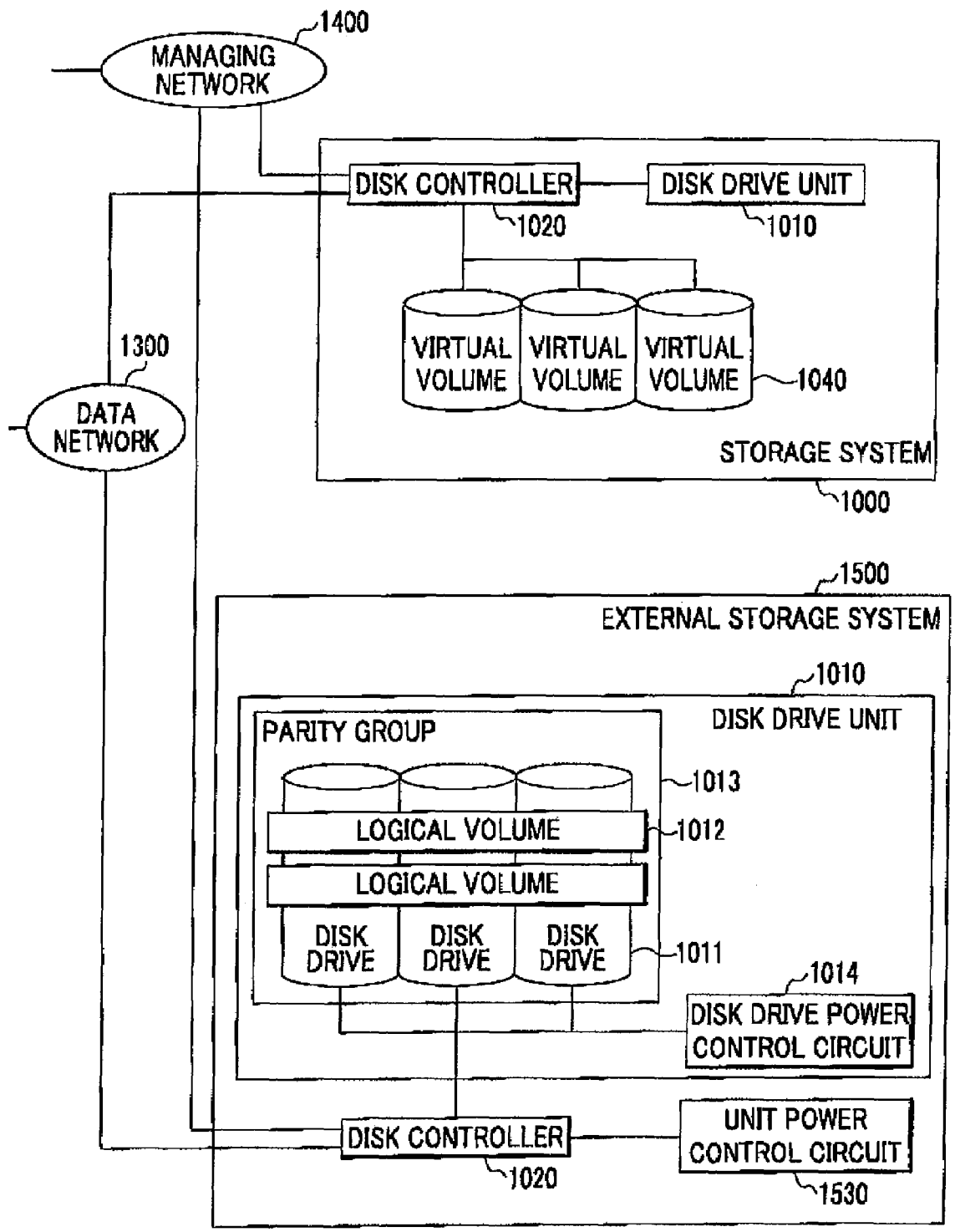
FIG. 17 is a block diagram of the computer system according to a second embodiment of the present invention.

FIG. 17 is a block diagram of a storage system according to the second embodiment. Because a large part of this configuration is the same as that of the first embodiment, FIG. 17 shows only parts having clear difference from those in the first embodiment. Hereinafter only the difference will be described.

In the second embodiment, an external storage system 1500 is newly added. The external storage system 1500 is connected to the storage system 1000 and the host computer 1100 (see FIG. 1) through the data network 1300. Further, the external storage system 1500 is connected to the storage system 1000, the host computer 1100, and the managing computer 1200 through the managing network 1400. In the second embodiment, to simplify the description, one external storage system 1500 is shown. However, more than one external storage system 1500 may be provided.

The external storage system 1500 includes the disk controller 1020, the disk unit 1010, and a unit power control circuit 1530.

The disk unit 1010 has the same basic configuration as that shown in FIG. 1, and thus, the duplicated description is omitted. Here, the disk drive power control circuit 1014 can be omitted in the disk drive unit 1010. The logical volume 1012 of the external storage system 1500 is used as an external volume with an external connection function in the other storage systems.

The unit power control circuit 1530 performs a power saving mode control when receiving the power control request transmitted from the journal monitoring program 1252 (see FIG. 1) through the managing network 1400. The power saving mode control is a control for switching the storage system 1500 from a normal operating status to a power saving mode, and vice versa. The power saving mode is that the unit power control circuit 1530 cuts off power for components other than components necessary for the power saving control in response to the power control request transmitted from the journal monitoring program 1252 through the managing network 1400.

In the storage system 1000, virtual volumes 1040 are added. In addition, the micro-program 1028 (see FIG. 1) in the disk controller 1020 is additionally provided with a function (not shown) for external connection using the external connection technology.

The virtual volume 1040 is a volume derived by virtualizing the logical volume 1012 in the external storage system 1500 with the micro-program 1028. The virtual volume 1040 can be used as the data volume, the journal volume, and the snapshot volume with the external connection function mentioned above similarly to the logical volume 1012 in the storage system 1000. In addition, writing data in the virtual volume 1040 is provided by writing the data in the logical volumes 1012 related to the virtual volumes 1012 in the external storage system 1500 with the external connection function.

Figures 18, 19:
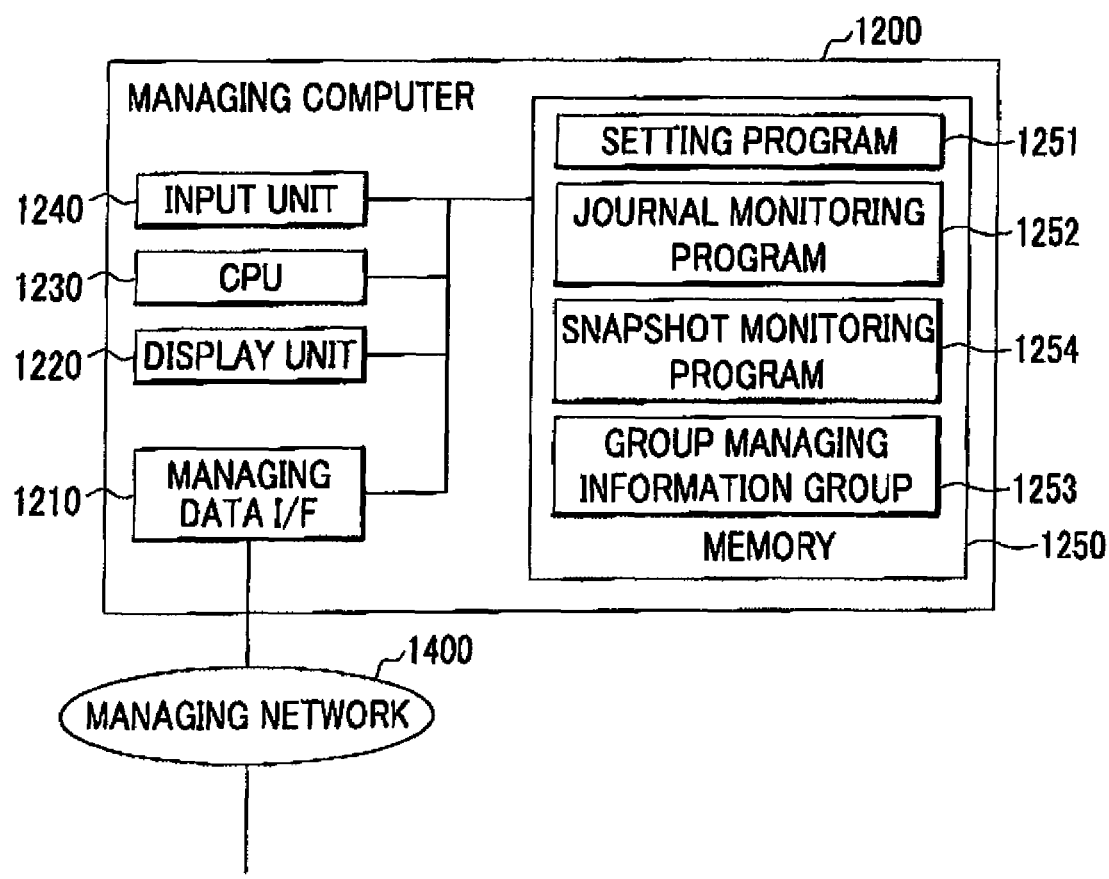
FIG. 18 shows an example of a virtual volume managing table according to the second embodiment.
FIG. 19 is a block diagram of the computer system according to a third embodiment of the present invention.

FIG. 18 shows an example of a virtual volume managing table for managing corresponding relations between the virtual volume 1040 and the logical volume 1012 in the external storage system 1500. The virtual volume managing table is stored in the main memory 1026 (see FIG. 1) of the disk controller 1020 in the storage system 1000.

A VOL_ID 19001 of a field stores identifiers of the virtual volumes to be managed. A capacity 19002 of a field stores capacities (storage sizes) of the virtual volumes indicated by the VOL_ID 19001. An external unit ID 19003 of a field stores identifiers of the external storage systems 1500 to which the logical volume 1012 for storing data in the virtual volume indicated by the VOL_ID 19001 belongs. A path 19004 of a field stores path information for accessing the logical volume 1012 to be virtualized from the storage system 1000 which tries to virtualize the logical volume in the external storage system 1500 with the external connection function. This may be a combination or the like of an identifier of a port in a data I/F 1022 in the storage apparatus such as a WWN (World Wide Name), a target ID in an SCSI (Small Computer System Interface), and an LUN (Logical Unit Number).

These values are set by that the manager performs a setting of the external connection function with the CLI provided by the setting program 1151. For example, the manager issues a command of "createVVOL -target P1_T1_L1 -targetArrayID DF700_1." This commands the storage system 1000 to generate an accessible virtual volume for the logical volume 1012 stored in a storage system having the external unit ID of DF700 with the port ID having a value of one, the target ID having a value of one, and the LUN having a value of one.

The combination of the port ID having a value of one, the target ID having a value of one, and the LUN having a value of one is stored in the path 19004, and the DF700_1 is stored in the external unit ID 19003. Further, when virtualizing, the CPU 1023 checks a storage size of the logical volume 1012 and sets the value in the capacity 19002. In addition, the CPU 1023 assigns an identifier unique to the generated virtual volume in the storage system 1000 to store the value in the VOL_ID 19001.

In the second embodiment, the external storage system 1500 is regarded as a partition. Thus, in FIGS. 10 and 11, the fields for storing the identifiers of the partition store identifiers of the external storage (corresponding to the external unit ID 19003).

Further, in the second embodiment, the parity group formation table 10291 in FIG. 2 and the volume table 10292 in FIG. 3 are unnecessary.

(2) Operation of the Second Embodiment

An operation of the second embodiment will be described.

Because a large part of the operation is the same as that of the first embodiment, hereinafter only a difference will be described.

In the second embodiment, the external storage system 1500 is regarded as the partition. To apply the processes shown from FIGS. 13 to 15 to the second embodiment, the term "parity group" in the description in these processes is read as the "external storage system". However, in the steps 15040, 15050, and 15090, regarding the power ON/OFF control request and the status acquisition request, the destination of these requests is changed to the unit power control circuit 1530 of the external unit indicated by the external unit 19003.

As mentioned above the second embodiment is described. According to the second embodiment, because the storage systems of the journal storing destinations in the journal group belonging to the linking managing group to be monitored can be linked even though the storage system 1000 is regarded as the partition, the journal storing destinations at certain timing can be localized over a plurality of the journal groups. As a result, a function for managing an attribution for each assembly of a specific logical volumes or an assembly of specific physical volumes can be applied to the journal management at a specific time zone. More specifically, in the second embodiment, an example is described in which the power of the external storage system 1500 having no possibility of storing the journal is turned OFF.

Third Embodiment

A third embodiment will be described. In the third embodiment, snapshot storing destinations are linked in addition to linking the journal storing destinations of a plurality of journal groups similarly to the first embodiment. Thus, the present invention is applicable to the case that a backup is used as a snapshot, type of the backup being such that backup data is fully prepared at acquisition timing such as the full backup or the differential backup. The third embodiment describes this example.

(1) System Configuration of the Third Embodiment

FIG. 19 is a block diagram of a storage apparatus according to the third embodiment. Because a large part of this configuration is the same as that of the first embodiment, FIG. 19 shows only parts having clear difference from those in the first embodiment. Hereinafter only the difference will be described.

In the third embodiment, a snapshot monitoring program 1254 is added in the memory 1250 of the managing computer 1200. The snapshot monitoring program 1254 monitors which one of the SSVOL groups each journal group stores the snapshot in, with referring and updating the information in the group managing information group 1253. Next, the snapshot storing destinations of respective journal groups are controlled to be mutually linked.

FIG. 20 shows an example of a managing group table 12533a for managing information of the linking managing group of which journal storing destination and the snapshot storing destination are mutually linked. Because this is similar to the managing group table 12533 in the first embodiment described with reference to FIG. 12, hereinafter only the difference will be described.

In the third embodiment, a currently-in-use partition (snapshot) 13004 of a field is added. The currently-in-use partition (snapshot) 13004 stores an ID of the partition to which the SSVOL group of a snapshot storing destination belonging to the linking managing group indicated by the managing ID 13001. The value is set by the CPU 1230 operating according to the snapshot monitoring program 1254. This operation will be mentioned later.

FIG. 21 shows an example of a snapshot storing destination linking managing table for managing information of the journal groups of which snapshot storing destinations are linked. The snapshot storing destination linking managing table is stored in the group managing information group 1253. A JNLG_ID 22001 of a field stores the identifiers of the journal groups. A generation number 22002 of a field stores the number of generation of the snapshot required by the journal group indicated by the JNLG_ID 11001.

These values are set by that the manager registers the number of the generation for the journal group of which snapshot storing destination is linked with the CLI provided by the setting program 1251. For example, the manager issues a command such as "setSSNum -jgid JNL_1 4." This commands the storage system 1000 to "set the number of generation of the journal group JNLG_1." The "JNLG_1" is stored in the JNLG_ID 22001, and the value of four is stored in the generation number 22002.

(2) Operation of Third Embodiment

An operation of the third embodiment will be described. Because the operation in the third embodiment is similar to that of the first embodiment, hereinafter only the difference will be described.

Figure 22:
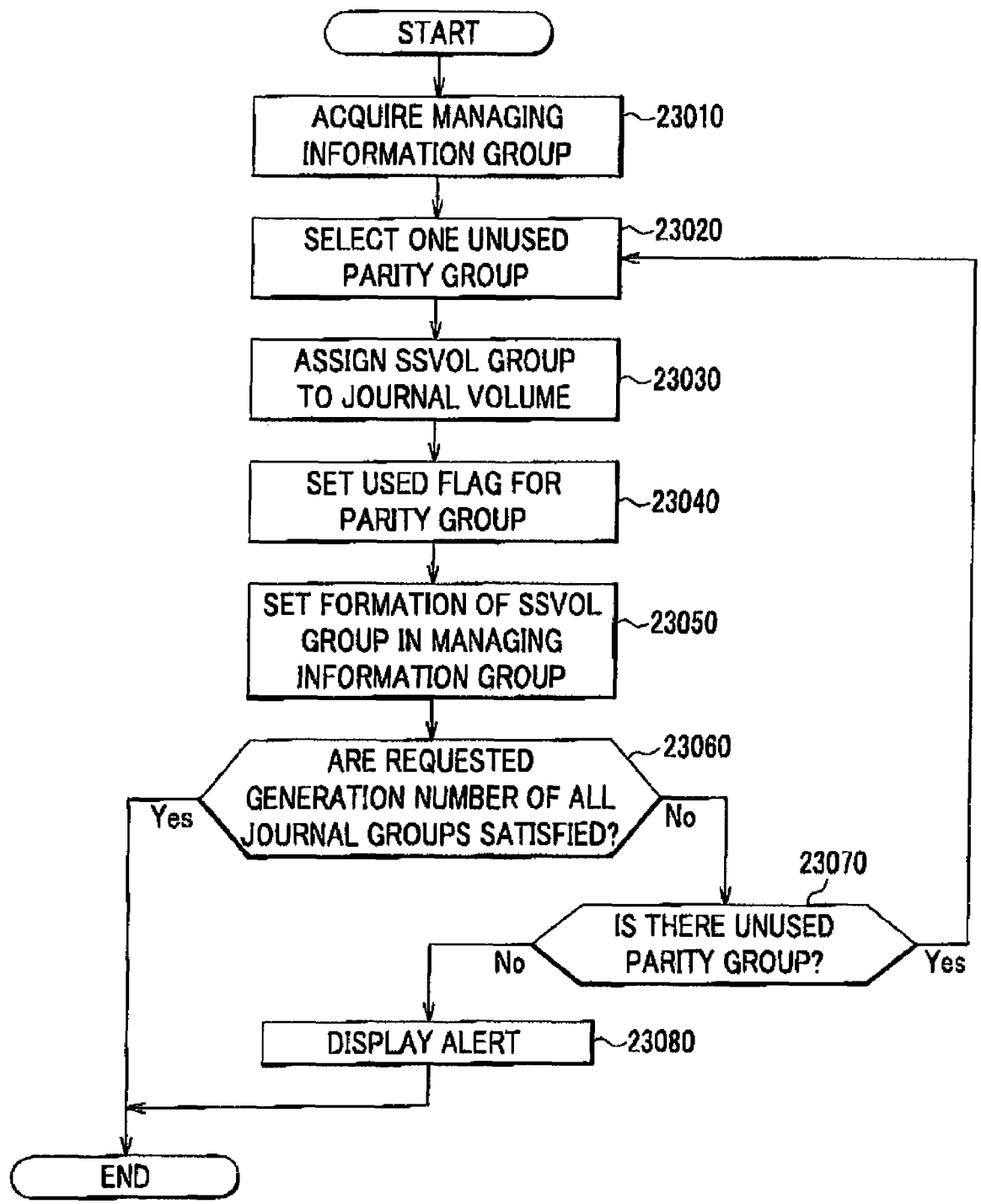
FIG. 22 shows an example of a snapshot group assigning process according to the third embodiment.

FIG. 22 shows a flow of a process in which the CPU 1230 operating according to the setting program 1251 assigns the SSVOL group to the journal group. The manager starts this process with the CLI provided by the setting program 1251. For example, the manager issues a command such as "setSSVolGroup Group_1." This is a command to assign the SSVOL group to the journal group included in the linking managing group Group_1 of which snapshot storing destination is to be linked.

When this process is started, first, the CPU 1230 acquires the managing information group 1029 from the CPU 1023 operating according to the micro-program 1028 (a step 23010).

Next, the CPU 1230 selects an unused parity group from the parity groups assigned to the specified linking managing group (a step 23020). More specifically, one of parity groups having a value of "FALSE" in the presence-or-absence of assignment is selected from the partition managing table 12532.

Next, the CPU 1230 assigns the SSVOL group to each journal group belonging to the specified linking managing group (a step 23030). Here, first, one snapshot volume is assigned to all data volumes belonging to each journal group. An assembly of the assigned snapshot volumes becomes the SSVOL group assigned to the journal groups to be managed. A method of assigning among the journal groups is arbitrary. However, preferably, assigning is made such that the number of the SSVOL groups assigned to each journal group provides a ratio close to a ratio of the generation number 22002 required in each journal group. Further, if a minimum value of the number of the data volumes belonging to the journal group to be monitored is smaller than the number of the logical volumes 1012 unused in the parity group, the process proceeds to the next step with the unused volumes left as they are, Next, the CPU 1230 sets the presence-or-absence of assignment 12003 to "TRUE" to indicate that the logical volume 1012 belonging to the corresponding parity group has been assigned as the snapshot volume (a step 23040).

Next, the CPU 1230 sets the SSVOL group assigned to each journal group in the managing information group 1029 (a step 23050). Here, the CPU 1230 sets the journal volume assigned in the step 14030 with the CLI provided by the above-mentioned setting program 1251. This makes values of the registered using order 8003 continuous for each parity group to which the SSVOL group belongs. As a result, this assures that the SSVOL groups in the same parity group are continuously used, as long as the snapshot storing destination is not changed compulsorily.

Next, the CPU 1230 checks whether a total generation number of the SSVOL groups assigned to each journal group satisfies the requested journal capacity (a step 23060). If it satisfies the condition (Yes), the process is finished. If it does not satisfy the condition (No), the process proceeds to the step 23070.

In a step 23070, the CPU 1230 checks whether there is an unused parity group in the parity group assigned to the specified linking managing group. If there is an unused parity group, the process proceeds to the step 23020 to perform the journal volume assigning process again. If there is no unused parity group (No), because the requested journal capacity cannot be satisfied, the CPU 1230 indicates an error (alert) as the execution result of this process (a step 23080), and the process is finished.

As mentioned above, the process of assigning the SSVOL group to the journal group is executed.

Figure 23:
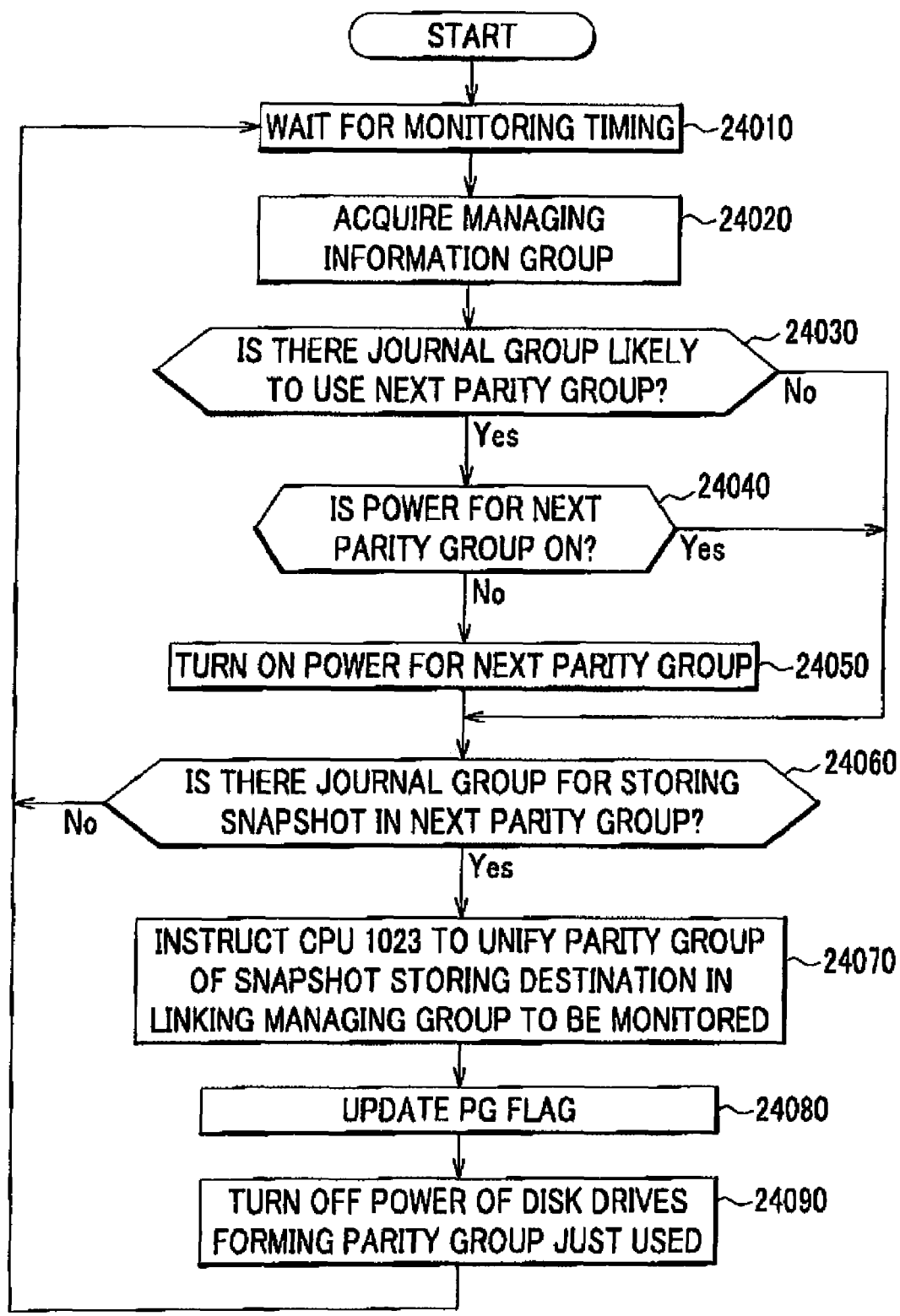
FIG. 23 shows an example of a snapshot storing destination monitoring and controlling process according to the third embodiment.

FIG. 23 shows a flow of a process in which the CPU 1230 operating according to the snapshot monitoring program 1254 monitors the snapshot storing destination of each journal group, and when the storing destinations disperse, the CPU 1230 controls the storing destinations to be localized. The manager starts the process with the CLI provided by the setting program 1251. For example, the manager issues a command such as "runSSMonitor Group_1." This is a command to "start to monitor and control the snapshot storing destination of the linking managing group Group_1 of which journal storing destinations are to be linked."

When starting the process, first the CPU 1230 waits for the timing of monitoring (a step 24010). This timing of monitoring is set in the monitoring period 13002.

Next, the CPU 1230 acquires the managing information group 1029 from the CPU 1023 operating according to the micro-program 1028 (a step 24020).

Next, the CPU 1230 checks whether there is a journal group likely to start to store the snapshot in a parity group different from the parity group which is the current SSVOl storing destination (a step 24030). Here, it is checked for each journal group whether there is the journal group of which SSVOL group storing the latest snapshot is the assigned SSVOL group and has a last using order 8003 within the currently-in-use partition (snapshot) 13004. If there is the journal group (Yes), the process proceeds to a step 24040. If there is no journal group (No), the process proceeds to a step 24060.

In the step 24040, the CPU 1230 checks whether the disk drives forming the parity group to which the SSVOL group to be used next belongs is ON. This is similar to the process in the step 15040 in the first embodiment shown in FIG. 14. If the disk drives are not ON (No), the CPU transmits an instruction to the disk drive power control circuit 1014 to turn ON the power of the disk drives forming the corresponding parity group (a step 24050). After this, the process proceeds to a step 24060.

In the step 24060, the CPU 1230 checks whether there is the journal group for storing the snapshot in a parity group other than the parity group indicated by the currently-in-use partition (snapshot) 13004. If there is no such a journal group (No), the process proceeds to a step 24010. If there is the journal group (Yes), the process proceeds to a step 24070.

In the step 24070, the CPU 1230 requests the CPU 1023 to change the snapshot storing destination of the journal group in which the journal is stored in the currently-in-use partition (snapshot) 13004 to a top SSVOL group of the next parity group. Here, "changing the snapshot storing destination to the next parity group" means that a first SSVOL group belonging to a parity group other than the parity group in which the snapshot is currently stored is searched in accordance with the use order of the snapshot, and the snapshot storing destination is compulsory changed to the SSVOL group. In other words, skipping is made without using the SSVOL group belonging to the currently-in-use partition (snapshot) 13004. Here, the operation of the CPU 1023 receiving the changing request will be described later.

Next, the CPU 1230 updates the flag of the currently-in-use partition (snapshot) 13004 so as to indicate the next parity group to reflect the status after changing (a step 24080).

Next, the CPU 1230 transmits an instruction to the disk power control circuit 1014 to turn OFF the power of the disk drives forming the parity group just used (a step 24090). After that, the process proceeds to a step 24010.

The process by the CPU 1230 operating according to the journal monitoring program 1252 is described above.

In the third embodiment, in changing the parity group of the snapshot storing destination for a single journal group, the snapshot storing destinations of the all journal groups in the linking monitoring group to be monitored are linked. Further, another condition may be set such that a change is inhibited until a predetermined storage size of the parity group indicated by the currently-in-use partition (snapshot) 13004 is used. In this case, just after "Yes" in the step 24060, the condition mentioned above is added. This provides an efficient use of the journal volume.

Further, in changing the parity group of the snapshot storing destination for a single journal group, when the snapshot storing destinations of the all journal groups in the linking monitoring group to be monitored are linked, there may be a journal group which cannot satisfy the requested journal volume capacity. To avoid this, as a modification, it is possible to dynamically assign the journal groups. To perform this, a process of dynamically adding an SSVOL group is added between the steps 24030 and 24040 described with reference to FIG. 23. This process is similar to the process shown in FIG. 15 in which the assignment of the journal volume is read as the assignment of the SSVOL group, and thus, the duplicated description is omitted.

Figure 24:
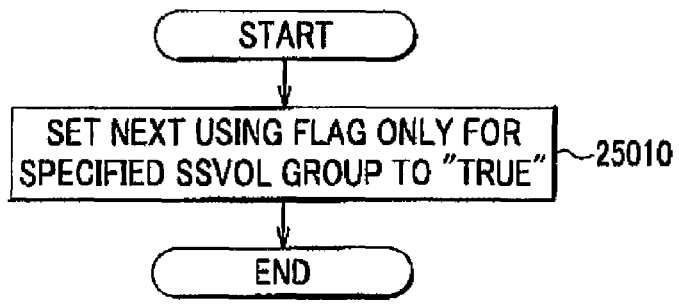
FIG. 24 shows an example of a snapshot storing destination changing process according to the third embodiment.

Next, with reference to FIG. 24 will be described a flow of the CPU 1023 receiving the instruction to change the journal storing destination journal volume from the CPU 1230 in the step 24070 in FIG. 23.

When receiving the instruction to change the journal volume of the journal storing destination from the CPU 1230, the CPU 1023 sets the next using flag 8004 of the specified SSVOL group to "TRUE", and sets the next using flags 8004 of other SSVOL group to "FALSE" (a step 25010).

As mentioned above, the process of the CPU 1023 receiving the instruction of changing the snapshot storing destination is executed.

The third embodiment is mentioned above. According to the third embodiment, the snapshot storing destinations can be linked in addition to that the journal storing destinations of a plurality of journal groups are linked as mentioned in the first embodiment. Thus, because the snapshot storing destinations of the journal groups belonging to the linking managing group to be monitored can be linked, the storing destinations of the snapshots at certain timing can be localized across a plurality of journal groups. Further, as a result, for each assembly of specific logical volumes or specific physical volumes, a function of managing an attribution can be applied to the snapshot management at the certain time zone. More specifically, the third embodiment shows an example in which the disk drives in the parity group having no possibility in storing the snapshot are turned OFF.

In the first to third described embodiments, the electrical conduction state is exemplified as the attribution. However, the attribution may be another one. For example, among the attribution are install locations, a copy status, presence or absence of access inhibition, and the like.

The status in which the attribution exists regarding the install location is that a plurality of types of locations of the journals (storing mediums) are prepared. Then, for example, this provides an efficient data management such that a storing medium with a high performance stores new journals and journals having a possibility of a high speed access and a storing medium with a low performance stores old journals and journals having a low possibility of high access.

The status in which the attribution exists regarding the copy status is such that the journals are classified in accordance with the status of copy (to a computer at a remote place) into, for example, one in which copy is completed, one in which copy operation is carried out, and one in which the copy operation is not started. Then, the journals can be efficiently managed regarding the copy status.

The status in which the attribution exists regarding the presence or absence of access inhibition is such that to protect the journal from illegal falsification, an access (overwriting or the like) to at least a part of the journal is inhibited. For example, because there is almost no necessity of rewriting in the journals which is old to some extent, an access to the journal is inhibited. This guarantees a higher security regarding the journal to which access is inhibited.

According to the present invention, the storing destinations of journals at the certain timing can be localized to the assembly of the logical volumes or the assembly of the physical volumes across a plurality of journal groups. This enables the function for managing the attribution for each assembly of a specific logical volumes or each assembly of a specific physical volumes to be applied to the management of the journals generated at the specific time zone.

The present invention is not limited to the first to third embodiments and can be modified without departure from the sense of the present invention.

The invention claimed is:

1. A computer system comprising:
   at least one host computer,
   a storage system for storing data used by the host computer, and
   a managing computer for managing storing the data in the storage system which are connected to each other through a network,
   wherein the storage system includes a plurality of disk drives configuring a plurality of parity groups in which a plurality of logical volumes are formed, and a processing part for receiving data sent from the host computer,
   wherein the logical volumes include at least a data volume for storing data sent from the host computer, a snapshot volume for storing a snapshot which is a data image of the data volume at a certain timing, and a plurality of journal volumes, correspondingly assigned to the data volume, for storing the received data as a journal, the journal volumes being classified into a plurality of groups of journal volumes,
   wherein the processing part recovers the data in the data volume at the certain timing by applying the journal to the snapshot,
   wherein first journal volumes in the journal volumes are classified in a first group in the groups of journal volumes and allocated to a first parity group in the parity groups, the first parity group stores destinations of journals of the first journal volumes,
   wherein the managing computer monitors the journal volumes when the managing computer detects that the storing destination of one of the first journal volumes which is classified in the first group changes from the first parity group to a second parity group which is different from the first parity group, transmits an instruction that the storing destination of the other first journal volumes which is classified in the first group is changed from the first parity group to the second parity group, and
   wherein the processing part of the storage system changes the storing designation of the other first journal volumes from the first parity group to the second parity group and stops power supply to the first parity group in response to the instruction from the managing computer.

2. The computer system as claimed in claim 1, wherein the processing part of the storage system makes setting to continuously use a journal volume in the same group when the journal volume is assigned to the data volume of the host computer in response to the instruction from the managing computer.

3. The computer system as claimed in claim 1, wherein each group of journal volumes is an assembly of journal volumes of which attributions can be changed simultaneously.

4. The computer system as claimed in claim 3, wherein the storage system includes a power supply and the attribution indicates a power supplying status of the whole of said each group of journal volumes from the power supply.

5. The computer system as claimed in claim 4, wherein the managing computer detects that a vacant capacity in a journal volume of a journal storing destination is less than a predetermined quantity to judge that one of the storing destinations of the journal is changed to the another group after a predetermined interval, and then the processing part of the storage system controls the power supply to supply the power to the group to which the storing destination is changed next.

6. The computer system as claimed in claim 5, wherein the managing computer detects a group of journal volumes which does not include the journal volume assigned to the data volume and transmits to the storage system an instruction to save a power to the group, and the processing part of the storage system controls, in response to the instruction from the managing computer, the power supply to save the power to the detected group.

7. The computer system as claimed in claim 1, wherein, when it is detected that a storing destination of a journal changes to another group, the managing computer transmits to the storage system an instruction to change the storing destination to the another group after a predetermined capacity of the journal volume in one of the groups is used, and the processing part of the storage system changes the storing destination to the another group after the predetermined capacity of the journal volume in the one of the groups is used.

8. The computer system as claimed in claim 1, wherein the managing computer transmits, when detecting the journal volume assigned to the data volume is insufficient, an instruction to assign a new one of the journal volumes to the data volume, and the processing part of the storage system assigns, in response to the instruction from the managing computer, the new one of the journal volumes to the data volume.

9. The computer system as claimed in claim 1, further comprising:
   a plurality of the storage systems,
   wherein one of the storage systems virtually manages the snapshot volumes and journal volumes in the disk drives of all of the storage systems as those in one storage system,
   wherein the virtually managed journal volumes are classified into a plurality of groups of virtually managed journal volumes, and wherein the processing part of the one of the storage systems changes the storing designation of a journal to another group in response to the instruction from the managing computer.

10. A data managing method in a computer system including:
at least one host computer, a storage system for storing data used by the host computer, and a managing computer for managing storing the data in the storage system which are connected to each other through a network,
wherein the storage system includes a plurality of disk drives configuring a plurality of parity groups in which a plurality of logical volumes are formed, and a processing part for receiving data sent from the host computer,
wherein the logical volumes includes at least a data volume for storing the data sent from the host computer, a snapshot volume for storing a snapshot which is a data image of the data volume at a certain timing, and a plurality of journal volumes correspondingly assigned to the data volume, for storing the received data as a journal, the journal volumes being classified into plurality of groups of journal volumes,
wherein the processing part recovers the data in the data volume at the certain timing by applying the journal to the snapshot, and
wherein first journal volumes in the journal volumes are classified in a first group in the groups of journal volumes and allocated to a first parity group in the parity groups, the first parity group stores destinations of journals of the first journal volumes,
said data managing method comprising the steps of:
in the managing computer, monitoring the journal volumes, when the managing computer detects that the storing destination of one of the journal volumes which is classified in the first group changes from the first parity group to a second parity group which is different from the first parity group, and transmitting an instruction that a storing destination of the other first journal volumes which are classified in the first group is changed from the first parity group to the second parity groups; and
in the processing part of the storage system, changing the storing designation of the other first journal volumes for the first parity group to the second parity group and stops power supply to the first parity group in response to the instruction from the managing computer.

11. The data managing method as claimed in claim 10, further comprising the step of:
in the processing part of the storage system, making setting to continuously use a journal volume in the same group when the journal volume is assigned to the data volume of the host computer in response to the instruction from the managing computer.

12. The data managing method as claimed in claim 10, wherein the each group of journal volumes is an assembly of journal volumes of which attributions can be changed simultaneously.

13. The data managing method as claimed in claim 12, wherein the storage system includes a power supply and an attribution indicates a power supplying status of the whole of a group of journal volumes from the power supply.

14. The data managing method as claimed in claim 13, further comprising the steps of:

in the managing computer, detecting that a vacant capacity in the journal volume of the journal storing destination is less than a predetermined quantity, and
in the processing part of the storage system, controlling the power supply to supply the power to the group of journal volumes to which the storing destination is changed next.

15. The data managing method as claimed in claim 14, further comprising the steps of:
in the managing computer, detecting the group of journal volumes which does not include the journal volume assigned to the data volume and transmits to the storage system an instruction to save a power to the group, and
in the processing part of the storage system controlling, in response to the instruction from the managing computer, the power supply to save the power to the detected group.

16. The data managing method as claimed in claim 10, further comprising the steps of:
when it is detected that the storing destination of the journal volume changes from one group to another group, in the managing computer, transmitting to the storage system an instruction to change the storing destination to another group after a predetermined capacity of the journal volume in the one group is used; and
in the processing part of the storage system, changing the storing destination of the journal volume of the one group to the another group after the predetermined capacity of the journal volume in the one group is used.

17. The data managing method as claimed in claim 10, further comprising the steps of:
in the managing computer, transmitting, when detecting the journal volume assigned to the data volume is insufficient, an instruction to assign a new one of the journal volumes to the data volume, and
in the processing part of the storage system, assigning, in response to the instruction from the managing computer, the new one of the journal volumes to the data volume.

18. A managing computer, connected through a network to at least a host computer and a storage system, for managing storing of data in the storage system,
wherein the storage system includes a plurality of disk drives configuring a plurality of parity groups in which a plurality of logical volumes are formed, and a processing part for receiving data sent from the host computer,
wherein the logical volumes include at least one data volume for storing data sent from the host computer, a snapshot volume for storing a snapshot which is a data image of the data volume at a certain timing, and a plurality of journal volumes correspondingly assigned to the data volume for storing received data from the host computer as a journal, the journal volumes which are classified into a plurality of groups of journal volumes,
wherein the processing part recovers data in the data volume at the certain timing by applying the journal to the snapshot, and
wherein first journal volumes in the journal volumes are classified in a first group in the groups of journal volumes and allocated to a first parity group in the parity groups, the first parity group stores destinations of journals of the first journal volumes,
said managing computer, comprising:
a processing part for monitoring the journal volumes when the managing computer detects that the storing destination of one of the first journal volumes which is classified in the first group changes from the first parity group to a second parity group which is different from the first parity group, transmitting an instruction to the storage system that the storing destination of the other first journal volumes which are classified in the first group is changed from the first parity group to the second parity group.

19. The managing computer as claimed in claim 18, wherein the processing part transmits to the processing part of the storage system an instruction to make setting to continuously use a journal volume in the same group when the journal volume is assigned to the data volume of the host computer.

20. The computer system as claimed in claim 18, wherein each group of journal volumes is an assembly of the journal volumes of which attributions can be changed simultaneously.

* * * * *